(12) United States Patent
Johnson et al.

(10) Patent No.: US 11,347,807 B2
(45) Date of Patent: *May 31, 2022

(54) CONCEPT-BASED QUERYING OF GRAPH DATABASES

(71) Applicant: AT&T Intellectual Property I, L.P., Atlanta, GA (US)

(72) Inventors: Theodore Johnson, New York, NY (US); Vladislav Shkapenyuk, New York, NY (US)

(73) Assignee: AT&T INTELLECTUAL PROPERTY I, L.P., Atlanta, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/813,372

(22) Filed: Mar. 9, 2020

(65) Prior Publication Data

US 2020/0210487 A1   Jul. 2, 2020

Related U.S. Application Data

(63) Continuation of application No. 15/268,182, filed on Sep. 16, 2016, now Pat. No. 10,621,236.

(51) Int. Cl.
  *G06F 16/903*   (2019.01)
  *G06F 16/901*   (2019.01)
  *G06F 9/455*    (2018.01)

(52) U.S. Cl.
  CPC .... *G06F 16/90335* (2019.01); *G06F 16/9024* (2019.01); *G06F 9/45558* (2013.01); *G06F 2009/45595* (2013.01)

(58) Field of Classification Search
  None
  See application file for complete search history.

(56) References Cited

U.S. PATENT DOCUMENTS 5,802,508 A   9/1998   Morgenstern
5,870,564 A   2/1999   Jensen et al.
(Continued)

FOREIGN PATENT DOCUMENTS

| CA | 2200924 C | 2/2001 |
| EP | 2549697 A1 | 1/2013 |
| WO | WO 2007/095331 A2 | 8/2007 |

OTHER PUBLICATIONS

Nepal et al.; "Query Issues in Image(multimedia) Databases"; Data Engineering, 1999 Proceedings 15th Int'l Conference; 8 pages.
(Continued)

*Primary Examiner* — Kim T Nguyen
(74) *Attorney, Agent, or Firm* — Guntin & Gust, PLC; Mark Wilinski

(57) ABSTRACT

A system may include a processor, a user input, and memory comprising a graph and executable instructions. The executable instructions may cause the processor to effectuate operations. The operations include receiving, via the user input, a query comprising a class generalization and pathway variables. The operations include identifying a query class based on at least the class generalization and determining an anchor set based on at least one of the pathway variables. The operations also include translating the pathway variables into a pathway algebraic expression based on the anchor set and the query class and executing the pathway algebraic expression on the graph to return a pathway set.

20 Claims, 15 Drawing Sheets

(56) References Cited

U.S. PATENT DOCUMENTS

| | | | |
|---|---|---|---|
| 6,029,162 | A | 2/2000 | Schultz |
| 6,219,833 | B1 | 4/2001 | Solomon et al. |
| 6,778,970 | B2 | 8/2004 | Au |
| 7,210,121 | B2 | 4/2007 | Xia et al. |
| 7,408,881 | B2 | 8/2008 | Acharya et al. |
| 7,447,667 | B2 | 11/2008 | Gong et al. |
| 7,668,665 | B2 | 2/2010 | Kim |
| 7,743,066 | B2 | 6/2010 | Meijer et al. |
| 7,836,119 | B2 | 11/2010 | Lucas et al. |
| 8,429,630 | B2 | 4/2013 | Nickolov et al. |
| 8,543,554 | B1 | 9/2013 | Singh et al. |
| 8,688,827 | B2 | 4/2014 | Gonzalez-Banos et al. |
| 8,689,171 | B2 | 4/2014 | Lucas et al. |
| 8,826,255 | B1 | 9/2014 | Avadhanula et al. |
| 9,075,818 | B2 | 7/2015 | Cavage et al. |
| 9,170,812 | B2 | 10/2015 | Vorbach et al. |
| 9,286,187 | B2 | 3/2016 | Brucker et al. |
| 9,379,971 | B2 | 6/2016 | Sem-Jacobsen et al. |
| 10,174,124 | B2* | 1/2019 | Chen .................. A61P 43/00 |
| 2004/0111255 | A1 | 6/2004 | Huerta et al. |
| 2006/0041661 | A1 | 2/2006 | Erikson et al. |
| 2006/0212429 | A1 | 9/2006 | Bruno et al. |
| 2008/0091408 | A1* | 4/2008 | Roulland ............. G06F 40/211 704/9 |
| 2008/0120594 | A1 | 5/2008 | Lucas et al. |
| 2009/0112932 | A1 | 4/2009 | Skierkowski et al. |
| 2011/0314382 | A1 | 12/2011 | Sweeney |
| 2013/0117272 | A1 | 5/2013 | Barga et al. |
| 2013/0261965 | A1 | 10/2013 | Delling et al. |
| 2014/0122452 | A1 | 5/2014 | Faerber et al. |
| 2014/0156200 | A1* | 6/2014 | Verhaegh ............... G16B 40/20 702/19 |
| 2014/0372438 | A1 | 12/2014 | Chandramouli et al. |
| 2015/0286684 | A1 | 10/2015 | Heinz et al. |
| 2015/0347559 | A1 | 12/2015 | Elias et al. |
| 2016/0117443 | A1* | 4/2016 | Van Ooijen ............ G16B 20/20 424/133.1 |
| 2018/0006897 | A1* | 1/2018 | Kanza ................. G06F 16/9024 |
| 2018/0006898 | A1* | 1/2018 | Kanza .................. H04L 41/145 |
| 2018/0081943 | A1* | 3/2018 | Johnson ............. G06F 16/2477 |
| 2018/0081990 | A1* | 3/2018 | Johnson ............ G06F 16/90335 |

OTHER PUBLICATIONS

Christophides et al.; "From Structured Documents to Novel Query Facilities"; ACM SIGMOD Record; vol. 23 No. 2; 1994; 19 pages.

Bakker et al.; "A Query Language Solution for Shortest Path Problems in Cyclic Geometries"; Proceedings of the IASTED Int'l Conference; Feb. 17-19, 2004; p. 203-207.

Yu et al.; Service selection algorithms for Web services with end-to-end Qos constraints; Dept. of Electrical Engineering and Computer Science; University of California; 2005; p. 103-126.

Lee et al.; "A Psuedo-Distance Routing (PDR) Algorithm for Mobile Ad-hoc Networks"; IEICE Trans. Fundamentals; vol. E89 No. 6; Jun. 2006; p. 1647-1656.

Boulmakoul; "Fuzzy graphs modelling for HazMat telegeomonitoring"; European Journal of Operational Research; vol. 175; 2006; p. 1514-1525.

\* cited by examiner

CONCEPT-BASED QUERYING OF GRAPH DATABASES

CROSS REFERENCE TO RELATED APPLICATIONS

This application is a continuation of, and claims priority to, U.S. patent application Ser. No. 15/268,182, filed Sep. 16, 2016, entitled "Concept-Based Querying of Graph Databases," the entire contents of which are hereby incorporated herein by reference.

TECHNICAL FIELD

This disclosure relates generally to network management and, more specifically, to systems and methods for modeling networks using a graph database that may be queried to discovery pathways in the network.

BACKGROUND

Communication networks have migrated from using specialized networking equipment executing on dedicated hardware, like routers, firewalls, and gateways, to software defined networks (SDNs) executing as virtualized network functions (VNF) in a cloud infrastructure. Network control is directly programmable and the underlying infrastructure is virtualized and abstracted from network services and functions. The ensemble of entities that may comprise a service—VNFs, VNF components (VFCs), virtual machines (VMs), and physical hardware—may dynamically change as the system operates. The complex and dynamic nature of virtualized SDNs makes inventory management a challenging task. An inventory database may facilitate the creation of SDN applications using a modeling language to achieve model-driven networking.

Traditional graph query languages are not designed to query a layered network inventory for discovering connectivity between nodes. For example, Gremlin or SPARQL are not designed to return pathways of varying length. For example, searches for a pathway of length not greater than "five return only pathways of length 5 and searches for "zero or more" steps do not restrict the length. Languages that may support pathways of varying length, such as Cypher, do not provide the ability to add constraints that refer to the extracted pathways. For example, such languages provide inadequate solutions for finding pairs of nodes that are connected via routers of some other time (e.g., a certain pathway does not exist between them).

Further, the outputs of traditional graph query languages are such that an additional query cannot be posed on the results of an original query. For example, some traditional query languages output a graph, while others may output a tuple of values, upon which an additional query cannot be applied.

To facilitate network management, it would be advantageous to query a network inventory to discover specific nodes, connectivity between nodes in some layer, hosting relationships between nodes on different layers, or induced pathways. Traditional query languages do not allow a clear expression of such queries because such queries do not treat pathways as first-class citizens of the language. For example, such query languages are not closed under composition.

There is a need for a technology that facilitates modeling of communication networks, including the types of network elements and the connections therebetween, in such a way that enables querying of that model to enable troubleshooting and creating of SDN applications, including queries for discovering pathways in the network, manipulating pathways, and time-travel queries.

This disclosure is directed to solving one or more of the problems in the existing technology.

SUMMARY

In accordance with an aspect, this disclosure may be directed to a system. The system may include a processor and a user input. The system may also include memory storing instructions that cause the processor to effectuate operations. The operations may include receiving, via the user input, a query comprising a class generalization and pathway variables. The operations may also include identifying a query class based on at least the class generalization and determining an anchor set based on at least one of the pathway variables. The operations may also include translating the pathway variables into a pathway algebraic expression based on the anchor set and the query class and executing the pathway algebraic expression on the graph to return a pathway set.

In accordance with yet another aspect, this disclosure may be directed to a method. The method may include receiving, at a processor, a query comprising a class generalization. The method may also include identifying, by the processor, a plurality of query classes based on the class generalization and translating the pathway variables into a pathway algebraic expression based on the plurality of query classes. The method may include executing the pathway algebraic expression on a graph to return a pathway set.

According to another aspect, this disclosure may be directed to a non-transitory computer-readable storage medium storing instructions that cause a processor executing the instructions to effectuate operations. The operations may include receiving a query comprising a class generalization. The method may also include identifying, by the processor, a plurality of query classes based on the class generalization and translating the pathway variables into a pathway algebraic expression based on the plurality of query classes. The method may include executing the pathway algebraic expression on a graph to return a pathway set.

BRIEF DESCRIPTION OF THE DRAWINGS

Aspects of the herein described systems and methods for network modeling and building, updating, and querying a graph database are described more fully with reference to the accompanying drawings, which provide examples. In the following description, for purposes of explanation, numerous specific details are set forth in order to provide an understanding of the variations in implementing the disclosed technology. However, the instant disclosure may take many different forms and should not be construed as limited to the examples set forth herein. Where practical, like numbers refer to like elements throughout.

FIG. 1b is a layered model that represents a layered graph database based on the exemplary network of FIG. 1a.

FIG. 3 is a schematic of an exemplary device that may be a component of the system of FIG. 2a.

DETAILED DESCRIPTION

Figure 1A:
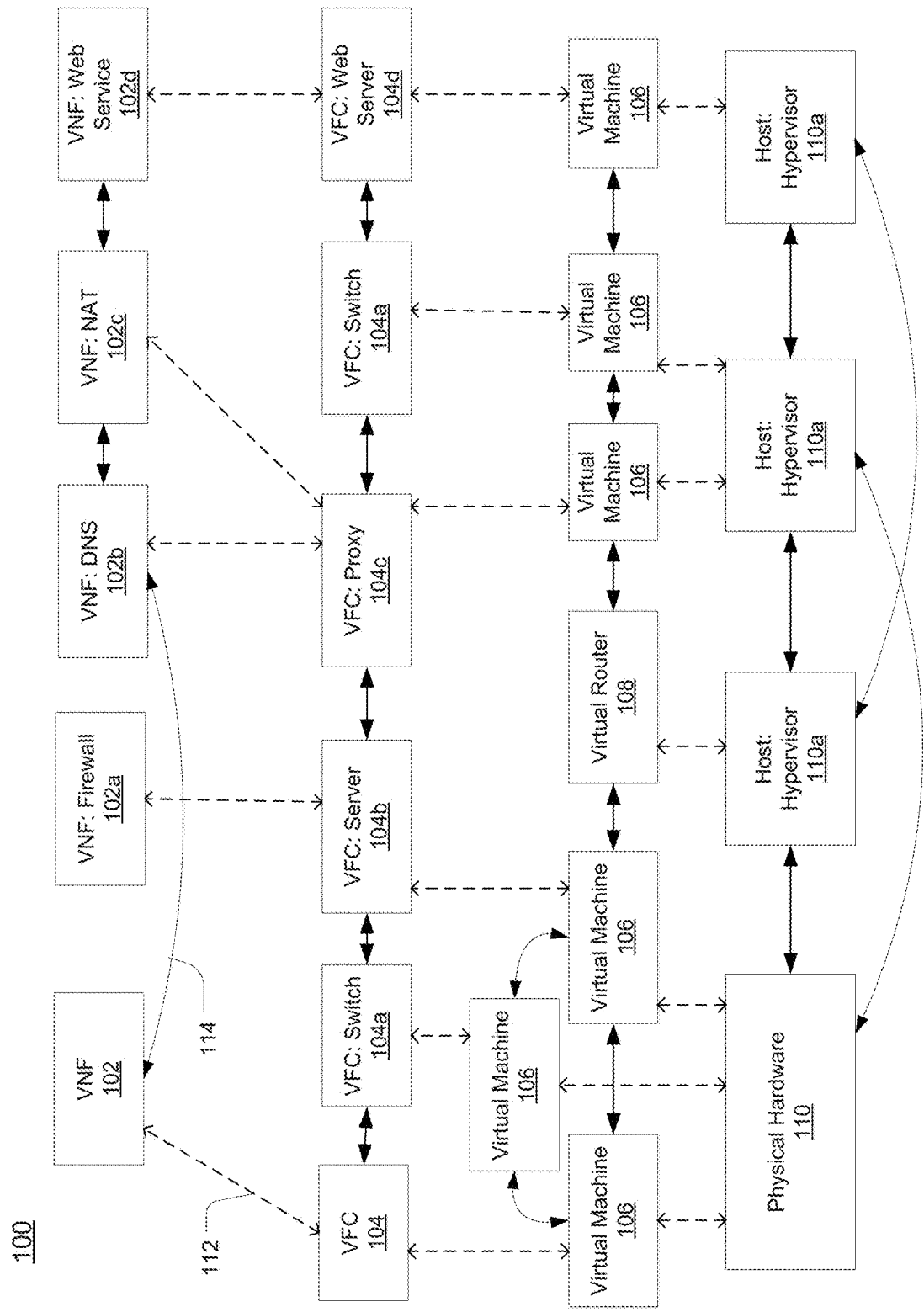
FIG. 1a is a representation of an exemplary network.

FIG. 1a is a representation of an exemplary communication network 100. Generally, communication networks 100 may be large, dynamic, or complicated. To deploy, maintain, and troubleshoot such networks 100, it may be advantageous to understand how network elements—such as servers, switches, virtual machines, and virtual network functions— are connected to one another. It may also be advantageous to discover communication paths between network elements, and how such relationships may change over time.

Network 100 may include network entities, including virtual network functions (VNFs) 102, such as a VNF: firewall 102a, a VNF: DNS 102b, a VNF: NAT 102c, or a VNF: web service 102d; VNF components (VFCs) 104, such as a VFC: switch 104a, a VFC: server 104b, a VFC: proxy 104c, or a VNF: web server 104d; a virtual machine (VM) 106; a virtual router 108; or physical hardware 110, which may include switches, routers, or hosts, such as a hypervisor host 110a. Relationships between nodes may include hosted-on, communicates with, or the like. For example, in FIG. 1a, vertical edges (dashed arrows) 112 may represent hosting relationships and horizontal edges (solid arrows) 114 may represent connectivity links.

An inventory of an SDN, like network 100, may store both the network entities as well as their relationships. These relationships may include which VFCs 104 make up VNF 102, which VMs 106 are running which VFCs 104, communication paths between VFCs 104, communication paths between one or more VFCs 104 and VNFs 102, which entities are hosting which other network entities, and the like.

A communication path may be a path that a message may travel between various components of network 100 to accomplish a task. For example, a communication path may determine a flow of data among components, such as between VMs 106, which in turn may determine a flow of data among physical hardware 110. This may be useful for diagnosing a problem in network connectivity or performance, which may be performed by translating from one layer of a network to another, such as from the virtual layer to the physical layer, as discussed below with regard to FIG. 1b. For example, this may indicate a change in hardware status that may be a contributing factor to a network outage.

Figure 1B:
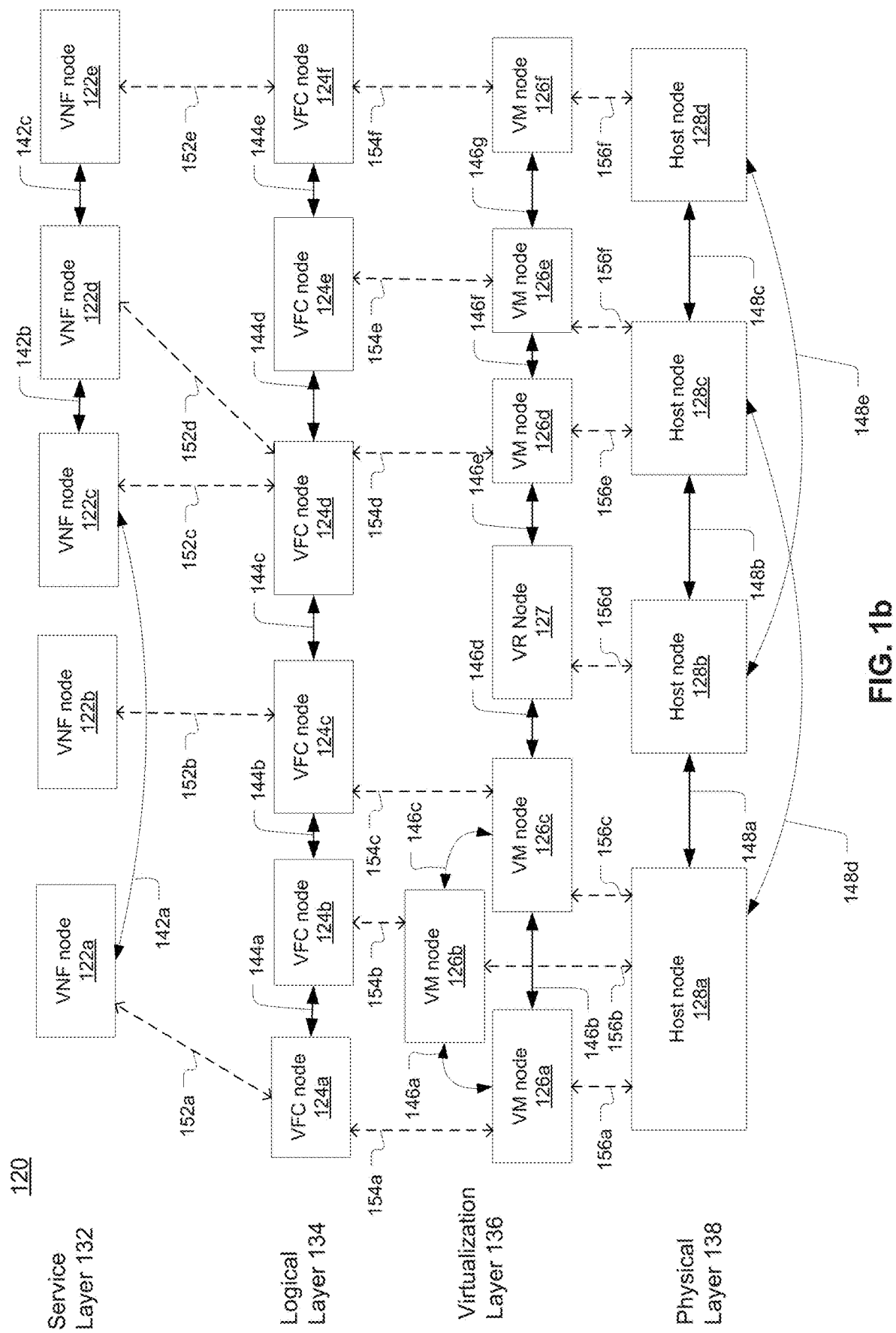

FIG. 1b illustrates an exemplary layered model of a network inventory 120 based on network 100. Network inventory 120 may be built using a schema, and this network inventory 120 may comprise or be represented as a layered graph. Further, a query language may be used to query network inventory 120, such as based on the schema. In an aspect, the schema and the query language may support Topology and Orchestration Specification for Cloud Applications (TOSCA) abstractions.

Network inventory 120 may be defined with respect to a schema, and it may be modeled as a directed graph whose nodes and edges may be instances of the node and edge classes of the schema, respectively. For example, ($C_V$, $C_E$, $H_V$, $H_E$) may be a schema with a set $C_V$ of node classes, a set $C_E$ of edge classes, a node hierarchy $H_V$, and an edge hierarchy $H_E$. A network inventory over the schema may be a directed graph G=(V, E), where V is a set of nodes and E, a subset of directed edges, is a subset of V×V. In the direct graph, node v may be an element of V and may be an instance of some class $C_v$, which itself may be an element of $C_V$ with respect to $H_V$. Likewise, each edge e may be an element of E and may be an instance of some class $C_e$, which itself may be an element of $C_E$ with respect to $H_E$. Optionally, the schema may contain additional constraints, which may be satisfied by G. An exemplary schema is discussed in more detail below. Network inventory 120 will be further discussed below with reference to FIG. 2b.

Figure 2A:
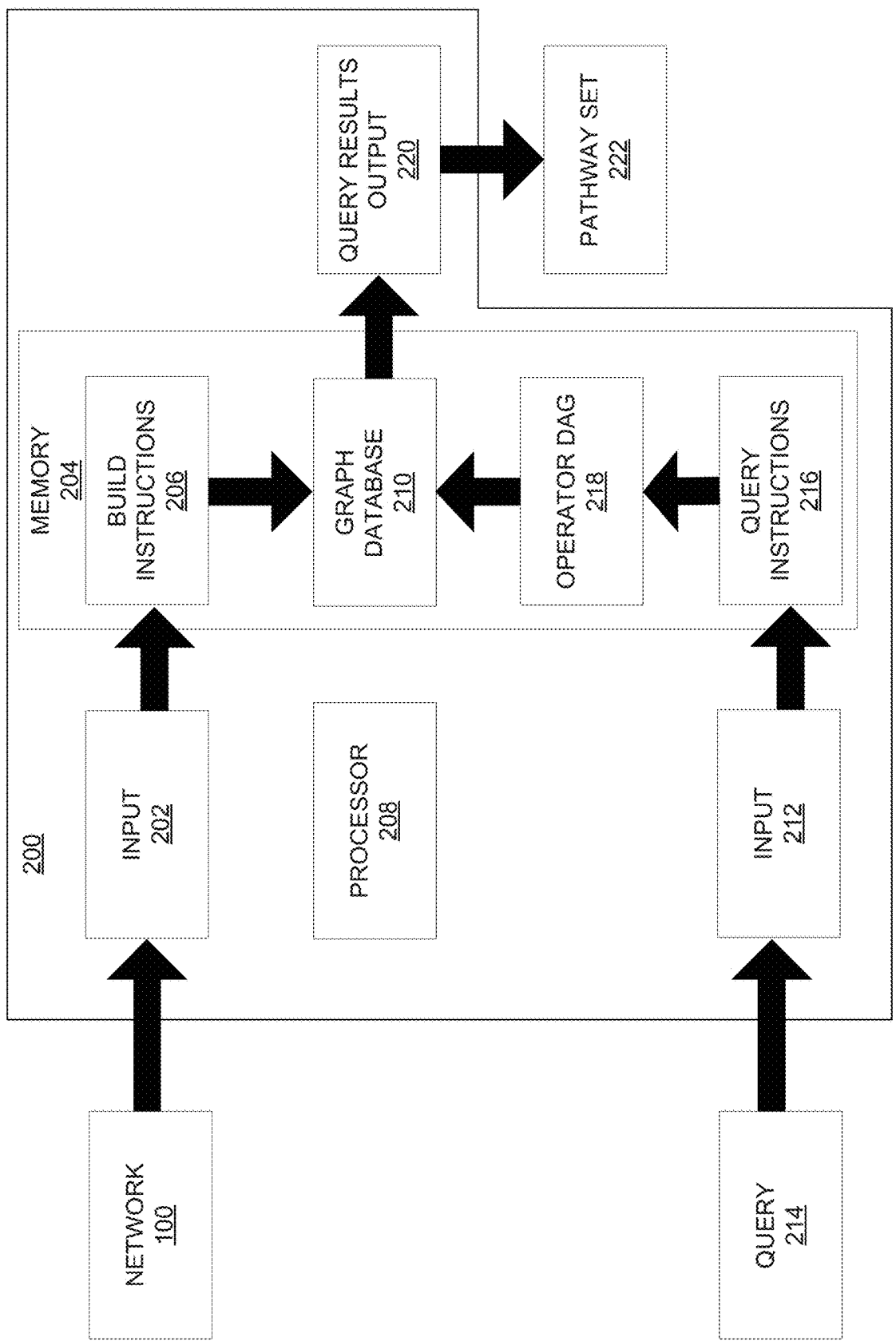
FIG. 2a illustrates a data flow for a system that may be used to create or query a graph database.

FIG. 2a illustrates a data flow that may use system 200 to create or update a graph database. In an aspect, system 200 may include an input 202 that may be adapted to communicate with network 100 or receive information regarding network 100. System 200 may also include memory 204. Memory 204 may store build instructions 206 that may cause a processor 208 of system 200 to effectuate operations. These operations may be based on, use, or otherwise relate to data received at input 202 from or indicative of network 100. Based on build instructions 206 or input 202, processor 208 may create or update a graph database 210.

Further, system 200 may be used to query graph database 210. In an aspect, system 200 may include a user input 212 through which system 200 may receive a query 214. (While user input 212 is shown as separate from input 202, they may be implemented as a single input.) Memory 204 may store query instructions 216 that may cause a processor 208 of system 200 to effectuate operations. These operations may be based on, use, or otherwise relate to data received at user input 212, as well as data stored in or related to graph database 210. For example, these operations may include or result in generating an operator DAG 218. Applying operator DAG 218 to graph database 210 may produce a set of pathways that satisfy query 214, which may be outputted from system 200 by a query results output 220 as a pathway set 222.

Figure 2B:
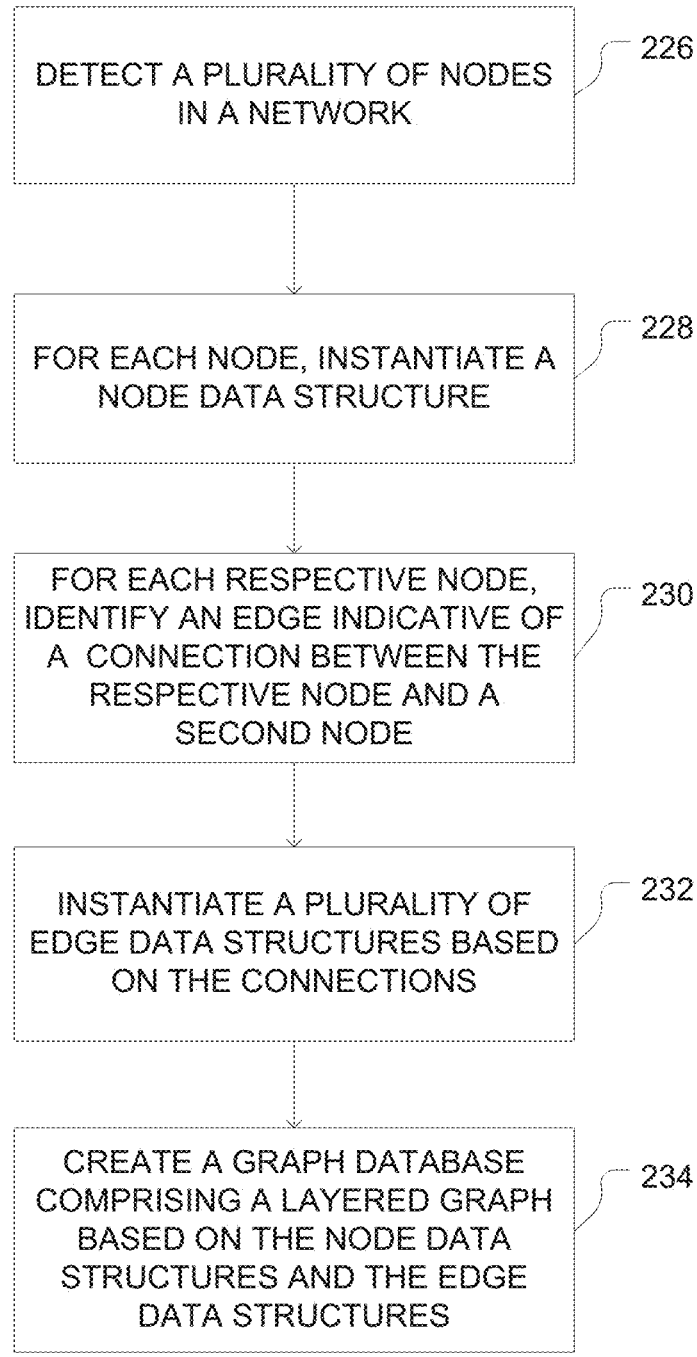
FIG. 2b is a flowchart of an exemplary method for creating a graph database.

FIG. 1a, 1b and FIG. 2b, illustrate a method 224 that may be used by system 100 to create graph database 210 to store the network inventory of network 100. At step 226, method 224 may include detecting a plurality of nodes in network 100. Nodes may be any network entities, whether implemented in software, hardware, or a combination thereof. For example, referring to FIG. 1a, the nodes detected at step 226 may include VNFs 102 (including VNF: firewall 102a, VNF: DNS 102b, VNF: NAT 102c, and a VNF: web service 102d), VFCs 104 (including VFC: switch 104a, VFC: server 104b, VFC: proxy 104c, and VNF: web server 104d); VMs 106; VR 108; and physical hardware 110 (including hypervisor host 110).

At step 228, method 224 may include instantiating a node data structure for each of the nodes. Each node data structure may belong to one or more node classes. A class may be a pair (N, A) of a class name N and a set of attributes A. Each node data structure may be an instance of a node class. When a node is an instance of a node class, it may have the attributes of the class. A class definition may include constraints on the types of values of its attributes. A class definition may specify default values for its attributes. Node classes may include a VNF node class, a VFC node class, a VM node class, a VR node class, a physical node class, or the like.

The class hierarchy may be a partial order over the class set. In an aspect, a class hierarchy may be denoted by <isa>. Given two classes $C_1=(N_1, A_1)$ and $C_2=(N_2, A_2)$, if $C_1$<isa>$C_2$, $C_2$ may be a superclass of $C_1$, and $C_1$ may be a subclass of $C_2$. For example, if $C_2$ is the virtualization node class, whose attributes are that nodes of the class belong to a virtualization layer 136, and $C_1$ is the virtual machine node class, whose attributes are that the nodes are virtual machines, then the virtualization node class may be a superclass of the virtual machine node class and the virtual machine node class may be a subclass of the virtualization class. In such cases, $A_2$ may be a subset of $A_1$. That is, virtual machine nodes are a subset of nodes that belong to the virtualization layer. A node v may be an instance of a node class $C_V$ if it is an instance of $C_V$ or any subclass of $C_V$.

A node data structure may indicate the node type. For example, this may be indicated based on a node class to which it belongs. Additionally or alternatively, this may be indicated by an attribute value of the node data structure. In an aspect, node data types may include a VNF type, a VFC type, a VM type, a physical node type, or the like.

Each node data structure may be associated with a layer of the layered graph. In an aspect, all nodes of the same class or the same node type may be part of the same layer. For example, VNF nodes 122 may be part of a service layer 132, and VFC nodes may be part of a logical layer 134, which may be below service layer 132. VM nodes 126 and VR nodes 127 may be part of virtualization layer 136, and host nodes 128 may be part of a physical layer 138.

The layers may be hierarchical, such that a node of layer i+1 is hosted on some node of layer i. For example, VM node 126 (of virtual layer 136) may be hosted on host node 128a (of physical layer 138). In an aspect, the lowest layer may be physical layer 138, which may comprise hardware, such as hypervisors, servers, or other machines, and the connections between them. The second layer may be virtualization layer 136, which may include VMs 106 or virtual routers 108 and the connections between them. The third layer may be the logical layer 134, which may include VFCs 104 that are deployed on VMs 106, and the connections between them. The fourth layer, service layer 132, may include the VNFs 102 and the connections between them. Different types of hierarchies may be defined in accordance with this disclosure.

At step 230, method 224 may include, for each respective node, identifying an edge. The edge may indicate a connection between the respective node and a second node. In an aspect, step 230 may include identifying all edges between nodes. Edges may indicate that two nodes are in communication with one another. Edges may indicate a physical connection between nodes. Edges may also indicate one node is deployed on another node, one node hosts another node, or one node is initiated on another node. For example, network 100 includes edges 112 and 114.

At step 232, method 224 may include instantiating a plurality of edge data structures based on the edges. That is, in network inventory 120, each edge 142, 144, 146, 148, 152, 154, and 156 may be associated with or based on an edge data structure. Each edge data structure may belong to one or more edge classes. Each edge data structure may be an instance of an edge class. When an edge data structure is an instance of an edge class, it may have the attributes of the class. A class definition may include constraints on the types of values of its attributes. A class definition may specify default values for its attributes.

In an aspect, the schema may include an edge-class hierarchy $H_E$. The class hierarchy may be a partial order over the class set. In an aspect, a class hierarchy may be denoted by <isa>. Given two classes $C_1=(N_1, A_1)$ and $C_2=(N_2, A_2)$, if $C_1$<isa>$C_2$, $C_2$ may be a superclass of $C_1$, and $C_1$ may be a subclass of $C_2$. For example, if $C_2$ is the intralayer edge class, whose attributes are that the target node of the edge is in a different layer than the source node of the edge, and $C_1$ is the virtualization-layer-to-logical-layer edge class, whose attributes are that the source node of the edge belongs to virtualization layer 136 and the target node of the edge belongs to logical layer 134, then the intralayer edge class may be a superclass of the virtualization-layer-to-logical-layer edge class and the virtualization-layer-to-logical-layer edge class may be a subclass of the intralayer edge class. In such cases, $A_2$ may be a subset of $A_1$. That is, virtualization-layer-to-logical-layer edges are a subset of intralayer edges. An edge e may be an instance of a node class $C_E$ if it is an instance of $C_E$ or any subclass of $C_E$. In another aspect, an edge class may contain a pair of source class and target class specifying the types of nodes that may be connected by an edge of that class. An edge class hierarchy may be such that if $C_1$<isa>$C_2$ for two edge classes, then for the source classes $C_{S1}$, $C_{S2}$, and target classes $C_{T1}$, $C_{T2}$, respectively, the following must hold: $C_{S1}$<isa>$C_{S2}$ and $C_{T1}$<isa>$C_{T2}$. An edge e may be an instance of an edge class $C_e$ if e is an instance of $C_e$ or of any subclass of $C_e$. If e is an instance of $C_e$ and the source node of e is $v_1$ and the target node of e is $v_2$, then $v_1$ may be an instance of the source class of $C_e$ and $v_2$ may be an instance of the target class of $C_e$.

In network inventory 120, there may be two types of edges: intra-layer edges and inter-layer edges. Intra-layer edges connect nodes that are on the same layer. Such edges may represent the ability of nodes of the same layer to communicate with one another. For example, edges 142 may represent the ability of certain VNF nodes 122 to communicate with one another. Similarly, edges 144 may represent the ability of certain VFC nodes 124 to communicate with one another, and edges 146 may represent the ability of certain VM nodes 126 and certain VR nodes 127 to communicate with one another. In physical layer 138, edges 148 may represent the ability of certain host nodes 128 to communicate with one another. Additionally, because host nodes 128 may be physical components, edges 148 may represent physical connections.

Inter-layer edges may connect nodes on two different layers. In model 120, inter-layer edges may connect nodes on two adjacent layers, such as edges 152 that connect certain VNF nodes 122 to certain VFC nodes 124, edges 154 that connect certain VFC nodes 124 to certain VM nodes 126, and edges 156 that connect certain VM nodes 126 or certain VR nodes 127 to certain host nodes 128. An inter-layer edge, such as edges 152, 154, or 156, may represent that some node is deployed on or instantiated on some other node of a lower layer. For example, edges 156 may represent that certain VM nodes 126 or VR nodes 127 are deployed on some host nodes 128. Edges 154 may represent that certain VFC nodes 124 are instantiated on certain VM nodes 126.

Each edge data structure may indicate the source node and the target node of the edge. For example, the edge data structure related to edge 152b may identify node 122b and node 124c. For bidirectional connections, the identity of the source node and the target node may be interchangeable. For example, if edge 152b is being ascended, then the source node may be 124c and the target node may be 122b, and if edge 152b is being descended, then the source node may be 122b and the target node may be 124c. Bidirectional connections may include directed edges, where the relationship of the target node to the source node may depend upon a direction in which the edge is being followed. For example, if the target and source nodes of 156a are 126a and 128a, respectively, then edge 156a may indicate that the target node is Hosted_By the source node, and if the target and source nodes of 156a are 128a and 126a, respectively, then edge 156a may indicate that the target node Hosts the source node. In an aspect, an edge may not be bi-directional. For example, an edge may represent that a first node may transmit information to a second node, but that second node may not transmit information to first node along the edge. In such a situation, the target node and the source node of that edge may not be interchangeable.

At step 234, method 224 may include creating a graph database comprising a layered graph based on the plurality of node data structures and the plurality of edge data structures. This may comprise a network inventory. The graph database may store the node data structures and the plurality of edge data structures such that the graph database may be queried to discovery pathways in network 100. The results of a query of the database may be a set of pathways.

As discussed above, network inventory 120, graph database 210, and its data structures may comply a schema. The schema may be robust enough to allow for different developers, working independently, to add new features to the schema. The schema may be designed such that a graph database built using the schema may be queried to access the complex entities and relationships in the network inventory at multiple levels of complexity, even without the user's knowledge of the different designers' approaches to adding features to the schema.

The schema may facilitate querying networks 100, including large, complicated networks, and may help in cases where the user only has partial information regarding the types of nodes or edges in the network. An exemplary schema is discussed with respect to FIG. 2c. In an aspect, the schema may include a base class, such as Base 236. The fields of Base 236 may be the internal system fields of each node and edge. Base 236 may have two subclasses: a node class and an edge class, such as Node 237 and Edge 240, respectively.

Node 237 may contain the fields that are common to all nodes. For example, a field that is contained in Node 237, such as a node_level field 238, may be contained in all subclasses of Node 237. For example, node classes NodeA 242, NodeB 244, NodeC 246, and NodeD 248 may be subclasses of Node 237. (NodeC 246 and NodeD 248 may directly be subclasses of NodeB 244 and may transitively be subclasses of Node 237.)

Edge 240 may contain the fields that are common to all edges. For example, Edge 240 may contain a source_node field 250 and a target_node field 252. All edges may be subclassed from Edge 240. For example, edge classes EdgeA 254, EdgeB 256, and EdgeC 258 may be subclasses of Edge 240. (EdgeC 258 may directly be a subclass of EdgeB 256 and may transitively be a subclass of Edge 240.)

A reference to a class, such as in a query, may refer to all instances of that class, and of all subclasses, in the database. A reference to a class may determine the fields that may be referenced in matching instances or queries. For example, a parent class may have two fields, and a subclass of the parent class may have those two fields in addition to a third field. When querying the parent class—which also may include querying all subclasses—for a match, the two shared fields of the parent and subclass may be referenced. Identification if which fields to access may be determined based on the class hierarchy schema.

The schema may also comprise two hierarchies: a node-class hierarchy 260 and an edge-class hierarchy 262). A node-class hierarchy Hv, such as Hv 260, may be a hierarchy over the node classes—for example, the node class and all subclasses of the node class (e.g., Node 237, NodeA 242, NodeB 244, NodeC 246, and NodeD 248)—and an edge-class hierarchy $H_E$, such as $H_E$ 262, may be a hierarchy over the edge classes—for example, the edge class and all subclasses of the edge class (e.g., Edge 240, EdgeA 254, EdgeB 256, and EdgeC 258). Hierarchies 260 and 262 may represent inheritance, as in object-oriented models.

Class hierarchies 260 and 262 may automate the creation of generalizing views by incorporating structure. The generalization of a class and its subclasses may be the parent class. New child and descendent classes may be added to the schema and the generalization view may be automatically computed. This may enable creation of strongly typed concepts.

In addition to hierarchies 260 and 262 (or hierarchical classes), the schema may also make use of entities, which may follow, at least in part, the entity-component system (ECS) modeling philosophy. Thus, class hierarchies and components may coexist in the schema.

Under an ECS modeling philosophy, entities may be data structures. An entity may have a collection of components associated with it. In turn, a component may be defined by a collection of fields. By combining class hierarchies and components, the power of class hierarchies for creating strongly typed concepts may be improved, while maintaining the ability to automatically generalize properties of class hierarchies.

As an example, a component VNF may be defined as:
Component VNF{
   string function
   string image
}

A component may be included in a class. For example, the class VNF may be defined as:

```
Class vnf{
    derived_from: node
    int vendor_version
    VNF
}
```

Using these definitions, the class vnf may have the following accessible fields: vendor_version, VNF.function (from component VNF), VNF.image (from component VNF), and any additional fields inherited from the node class.

The schema may abide by certain rules to allow the schema to use both hierarchical classes and components. For example, the schema may have a single base class Base 236. Base may have no components. Base may have two subclasses, Node 237 and Edge 240. All fields in Base 236 may have distinct names. Each node class may be directly or transitively subclassed from Node 237. Each edge class may be directly or transitively subclassed from Edge 240. If A is a subclass of B, A may have all of the fields of B; A may also have additional fields that B does not contain, as long as those additional fields have each have a name that is distinct from the name of any other of the additional fields and from any of the fields of B. Components may form a class hierarchy. A collection of base components may be independent of (e.g., not derived from) each other or from Base 236. For example, consider components C, D, E, and F. A component C that is subclassed from component D may have all of the fields of C. C may also have additional fields that D does not contain, as long as those additional fields have each have a name that is distinct from the name of any other of the additional fields and from any of the fields of D. Returning to class A, which may be a subclass of class B, A may contain all of the components of B; A may also have additional components that B does not contain. A may not be able to add any pair of components that share a base component. A may not add a component E that shares a base component D with a component F in B, unless E is a subclass (e.g., directly or transitively) of F. If E is a subclass of F, E may override F as a member of A. A field in class that is not a member of a component may be referenced by its field name. A field of a component in a class may be referred to by a combination of the component name and the field name. For example, if component C contains a field named "spotRun," that field may be referred to as C.spotRun.

As discussed above, components may follow a hierarchy, similar to the hierarchy of the classes. Just as the example class above "vnf" is derived from the Node class, a component may be derived from another component. For example, consider the example component VNF, as discussed above:

```
Component VNF{
    string function
    string image
}
```

Another component may be derived from VNF:

```
Component DNS{
    derived_from: VNF
    int logging_level
}
```

Thus, component VNF:DNS may include three component fields: function (from component VNF), image (from component VNF), and logging_level.

Recall class vnf from an earlier example:

```
Class vnf{
    derived_from: node
    int vendor_version
    VNF
}
```

Now, a class dns_vnf may be defined as follows:

```
Class dns_vnf{
    derived_from: vnf
    DNS
}
```

Such a definition may be valid because DNF is derived from VNF, and is therefore may be allowed by the class construction rules. Class dns_vnf may have the fields vendor_version (from class vnf), DNS.function (from component DNS and transitively from component VNF), DNS.image (from component DNS and transitively from component VNF), and DNS.logging_level (from component DNS), in addition to any fields inherited from Node class.

The following class is invalid because VNF and DNS share the same root component (VNF) and cannot both be part of a class:

```
Class Dns_Vnf{
    derived_from: Node
    VNF
    DNS
}
```

As another example, a router component may be defined as:

```
Component ROUTER{
    ipaddress[ ] interfaces
    string bgp_settings
}
```

And a virtual router class may be defined as:

```
Class vrouter{
    derived_from: vnf
    ROUTER
}
```

Class vrouter may have fields vendor_version (from class vnf), VNF.function (from component VNF), VNF.image (from component VNF), ROUTER.interfaces (from component ROUTER), ROUTER.bgp_settings (from component ROUTER), and any fields inherited from Node class.

Another way to define a class of virtual routers may be as follows:

```
Class vRouter{
    derived_from: Node
    string vendor_name
    VNF
```

```
        ROUTER
}
```

Classes vrouter and vRouter may be similar. A difference between vrouter and vRouter is that the former has field vendor_version and the latter has field vendor_name.

Classes vrouter and vRouter provide an example situation in which two design groups created different classes to describe the same network entity: in this case, virtual router 108. While classes vrouter and vRouter share commonalities, without creating a strongly-typed concept to generalize vrouter and vRouter, a user querying a graph database for all virtual routers would need to know that virtual routers may appear as instances of either class vrouter or class vRouter.

Class vrouter and class vRouter may both be generalized by their least common ancestor Node class (each of these classes is derived_from Node). However, for purposes of querying, Node class may be too broad—including, in addition to virtual routers, VNFs and VFCs, for example. On the other hand, querying simply vrouter or vRouter may be too narrow. For example, network inventory 120 includes VR Node 127, but if VR Node 127 is an instance of vrouter, a query for all instances of vRouter would incorrectly suggest that network inventory 120 does not include any virtual routers.

To increase the precision of querying network inventory 120 based on the schema, a strongly typed concept that generalized vrouter and vRouter may be created.

Figure 2C:
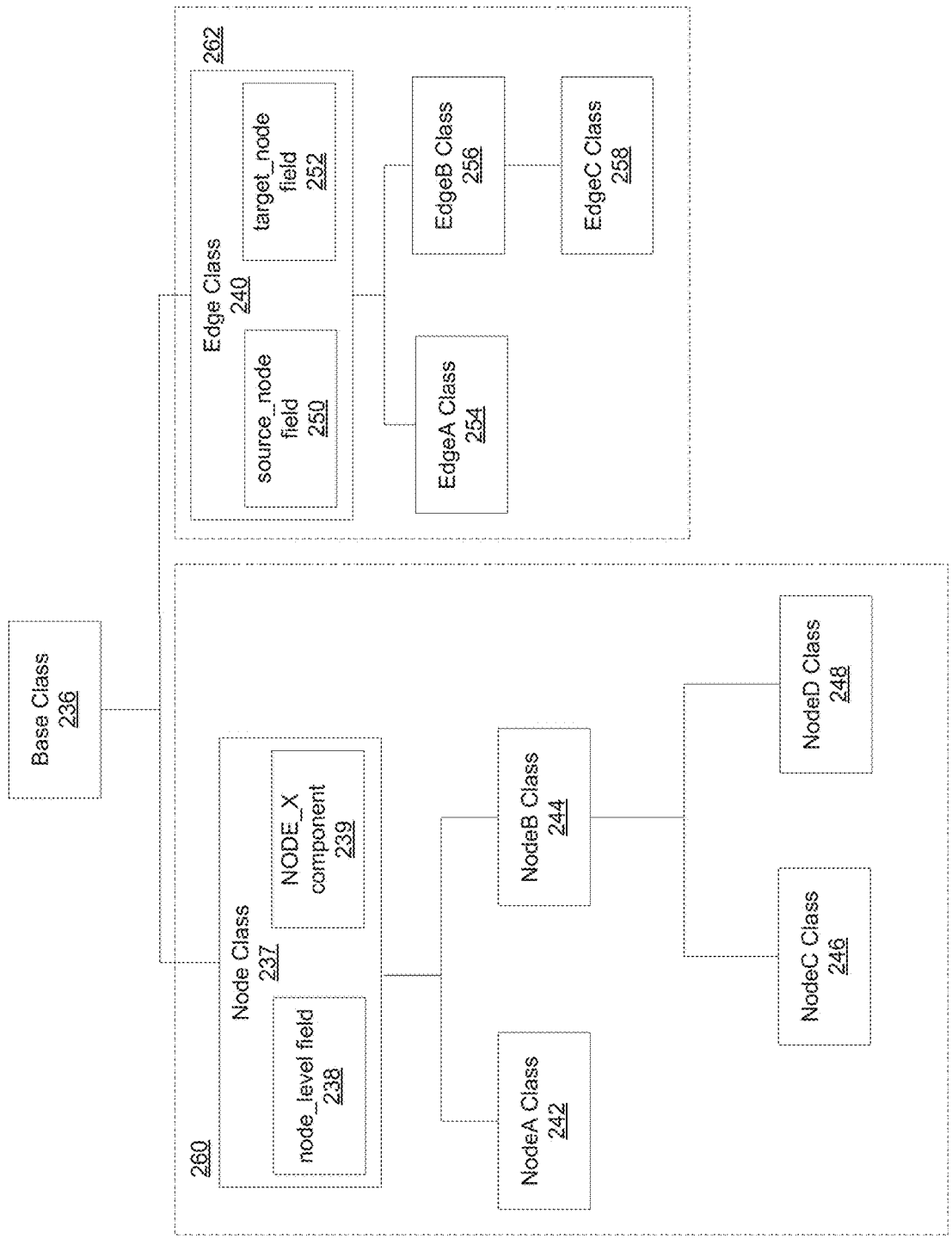
FIG. 2c is a representation of a schema that may be used for creating a graph database.
Figure 2D:
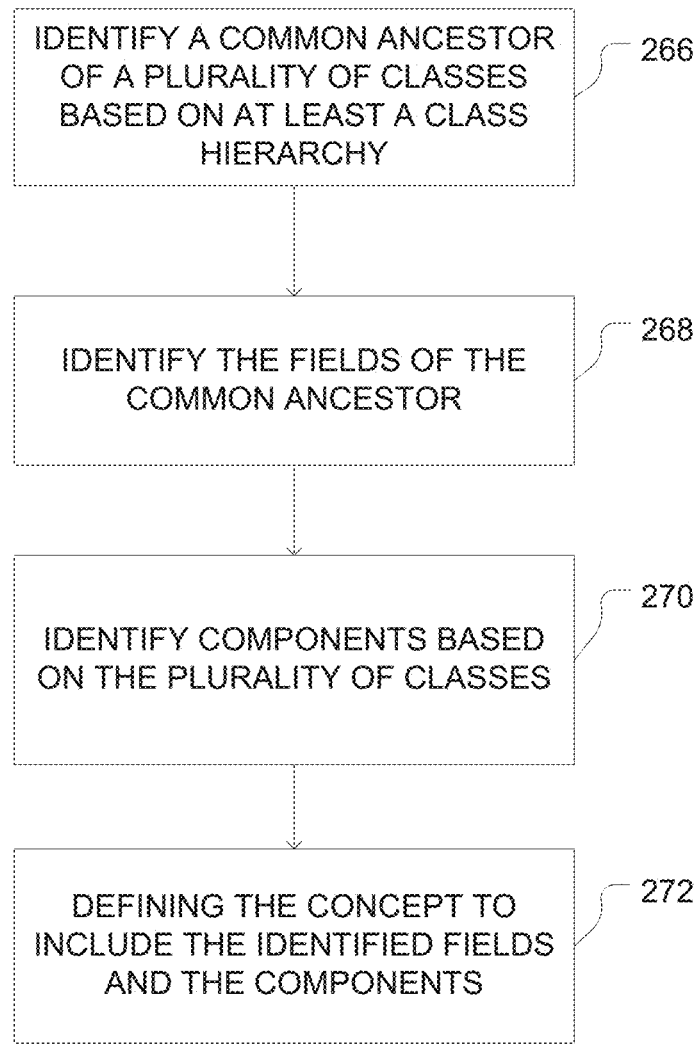
FIG. 2d is a flowchart of an exemplary method for defining a strongly typed concept.

FIG. 2d illustrates an exemplary method 264 that may be used to create a strongly-typed concept. At step 266, method 264 may include identifying a common ancestor of a plurality of classes based on at least a class hierarchy. A common ancestor of a plurality of classes is a class from which all of the plurality of classes directly or transitively depend. For example, referring to FIG. 2c, NodeB 244, NodeC 246, and NodeD 248 share the following ancestors: NodeB 244, Node 237, and Base 236. In an aspect, step 266 may include identifying a least common ancestor. A least common ancestor has the lowest hierarchical level of all of the ancestors. Thus, of the three ancestors—NodeB 244, Node 237, and Base 236, NodeB 244 may be considered the least common ancestor.

As another example, consider the classes vrouter and vRouter discussed above, and copied below:

```
        Class vrouter{
            derived_from: vnf
            ROUTER
        }
        Class vRouter{
            derived_from: Node
            string vendor_name
            VNF
            ROUTER
        }
```

An ancestor (and the least common ancestor) of vrouter and vRouter may be Node 236. (While vrouter may be derived from vnf, vnf may be derived from Node 236.)

At step 268, method 264 may include identifying the fields of the ancestor. For example, the fields of Node 236 may include node_level 238.

At step 270, method 264 may include identifying components based on the plurality of classes. The components may be identified as follows: components of a component hierarchy may be included if each of the plurality of classes has at least one component in that component hierarchy. For example, the components based on vrouter and vRouter may include VNF and ROUTER.

As another example, consider a plurality of classes that comprises dns_vnf and vrouter (defined above). As defined above, class dns_vnf may include the component DNS and component VNF (based on DNS being derived from VNF). Class vrouter may include the component ROUTER and, based on vrouter being derived from vnf, the component VNF (which is included in class vnf). Thus, each class, dns_vnf and vrouter, has a component in the component hierarchy that includes VNF and DNS. Thus, the components based on the classes dns_vnf and vrouter may include VNF.

At step 272, a strongly typed concept may be defined based on the fields identified at step 268 and the components identified at step 270. Thus, for the plurality of classes comprising vrouter and vRouter, the concept may be defined as the fields of Node 236 (e.g., node_level 238) and the components VNF and ROUTER. For the plurality of classes comprising dns_vnf and vrouter, the concept may be defined as the fields of Node 236 (e.g., node_level 238) and the component VNF.

Just as system 200 may define a strongly typed concepts based on classes, their related class hierarchies, their fields, their components, or their component hierarchies, the inverse may also true: given one or more fields or components, system 200 may facilitate querying multiple classes. This may solve the problem presented by different developers creating different classes to define the same network elements, such as the vrouter and vRouter examples.

A network administrator, operator, or other user may query graph database 210. For example, a network administrator may wish to identify any or all virtual routers 108 represented in network inventory 120 or graph database 210.

One approach for building a query is to explicitly lists all of the classes that may be used to represent virtual routers 108. For example, the query may state, at least in part: n (isa 'vrouter') or n (isa 'vrouter')

However, a user querying graph database 210 may not be aware of all (or any) of the classes representing virtual routers in graph database 210. Thus, another solution is for a query to identify the components that must be in the classes. For example, the query may list component ROUTER, or components ROUTER and VNF. Based on the example above, this would include the collection of classes vrouter and vRouter.

As another example, a user may be aware of a parent class and one or more components. For example, a user may build a query based on the parent class vnf and the component ROUTER.

As yet another example, a user may be aware that classes built to represent virtual routers in network inventory 120 share some metadata, such as a common developer, an intent, or the like. For example, a user may build a query by identifying a collection of classes created by ATT_atlanta_developers.

Thus, system 200 may be capable of translating or executing queries querying for instances of one or more classes without receiving as inputs the classes.

Figure 2E:
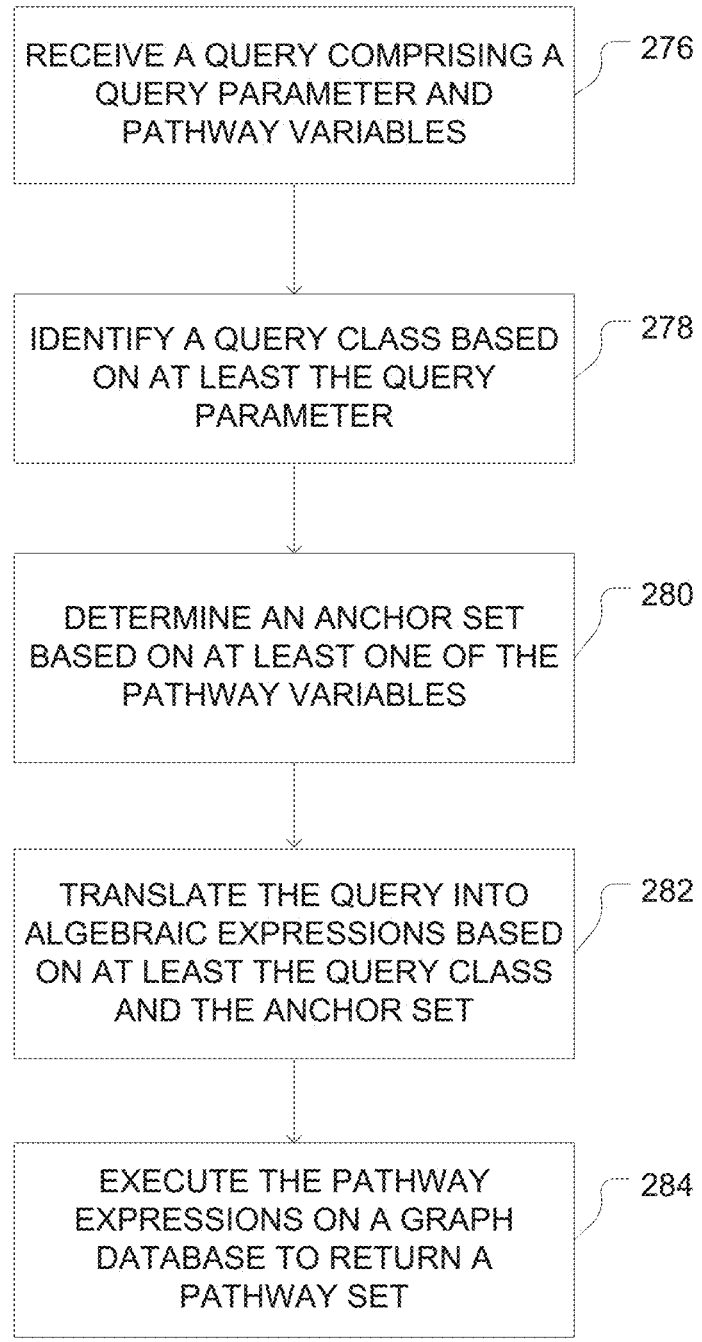
FIG. 2e is a flowchart of an exemplary method for querying a graph database.

Method 274, depicted in the flowchart of FIG. 2e may be an example of a robust, flexible system for querying graph database 210. At step 276, method 274 may include receiving a query (e.g., query 214). For example, system 200 may receive a query 214 via user input 212. Query 214 may be written in a query language. A query language for querying the graph database represented in FIG. 1b is disclosed. In an aspect, the query language may consider pathways as first-class citizens. The input and the output of query 214 in the query language may each be a set of pathways, so that the query language is closed under composition.

As an example throughout the following description, query 214 may be:
RETRIEVE P
FROM HORIZONTAL P, DESC P1, DESC P2
WHERE P1 MATCHES 'n(id=124a)→n( )→n( )' AND P2 MATCHES 'n(id=124e)→n( )→n( )' AND source(P)=target(P1) AND target(P)=target (P2) AND P MATCHES 'n( ){0, 10}'.

In an aspect, a retrieved pathway (e.g., the results of query 214 outputted by query results output 220) may comply with a structure definition, such as a regular pathway expression. In an aspect, a regular pathway expression may comprise edge patterns or node patterns. A node pattern may be denoted by n(ϕ), where ϕ may be a list of constraints on attributes, and may be satisfied by nodes whose attributes satisfy the constraints. A node pattern with an empty list of constraints—e.g., n( )—may be satisfied by any node. As an example, the following may define a node pattern that is satisfied by active virtual machines with at least 4 GB of memory:
n(class isa 'VM', status='active', memory≥4)

Edge patterns may be denoted by e(ϕ), where ϕ may be a list of constraints on attributes, and may be satisfied by edges whose attributes satisfy the constraints. An edge pattern with an empty list of constraints—e.g., e( )—may satisfied by any edge. As an example, the following may define an edge pattern that is satisfied by ascending edges whose target node is a VNF node:
e(class isa ASC)→n(class isa VNF)

In addition to the node pattern n(ϕ) and the edge pattern e(ϕ), regular pathway expressions may include other styles. For example, for a regular pathway expression p, the repetition of p—which may be expressed as p{$i_1$, $i_2$}, where $i_1$ and $i_2$ are integers such that $0 \leq i_1 \leq i_2$—may itself be another regular pathway expression. As another example, for two regular pathway expression $p_1$ and $p_2$, the concatenation of $p_1$ and $p_2$—which may be expressed as $p_1 \rightarrow p_2$ or ($p_1 \| p_2$)—may itself be another regular pathway expression. As another example, for two regular pathway expression $p_1$ and $p_2$, the disjunction of $p_1$ and $p_2$—which may be expressed as ($p_1 | p_2$)—may itself be another regular pathway expression.

As part of querying a network, a determination of when a pathway may be satisfied by a given regular pathway expression may be made. As an example, pathway p may be a pathway of the form $v_1, e_1, v_2, e_2, \ldots, v_{k-1}, e_{k-1}, v_k$. Pathway $p_1$ may satisfy p{$i_1$, $i_2$} if $p_1$ comprises at least $i_1$, and at most $i_2$, consecutive subsequences that satisfy p. For example, n(class isa 'VM'){3,5} may be satisfied by pathways that go via 3, 4, or 5 consecutive nodes of class VM (e.g., nodes 126). In an aspect, if $i_1$=0—e.g., p{0, $i_2$}—then p may be optional. Thus, n(class isa 'VM'){0,5} may be satisfied by pathways that go via 1, 2, 3, 4, or 5 consecutive nodes of class VM (e.g., nodes 126) or by pathways that do not contain any nodes of class VM. Similarly, the expression e(class isa 'DependsOn'){2,3} may be satisfied by a pathway that goes via 2 or 3 consecutive edges of class 'DependsOn.'

As another example, a given pathway expression may include a concatenation. A determination of whether a pathway satisfies a concatenation may be made in multiple ways. For example, pathway p may satisfy $p_1 \rightarrow p_2$ if there is a node $v_i$ in p that such that the subsequence $v_1 \ldots, v_i$ satisfies $p_1$ and either the subsequence $v_{i+1} \ldots v_k$ or the subsequence $e_i, v_{i+1}, \ldots v_k$ satisfies $p_2$. Additionally or alternatively, pathway p may satisfy $p_1 \rightarrow p_2$ if there is an edge $e_i$ in p that such that the subsequence $v_1 \ldots, v_i, e_i$ satisfies $p_1$ and either the subsequence $v_{i+1}, \ldots v_k$ or the subsequence $e_{i+1}, v_{i+1}, \ldots v_k$ satisfies $p_2$. In an aspect, following a node pattern or an edge pattern can be an edge pattern or a node pattern. For example, the pathway expression n(class isa 'VM')→e(class isa 'HostedOn')→e(class isa 'DependsOn')→n(class isa 'VR')→n(class isa 'VM') may be satisfied by pathways that start at a VM node (e.g., node 126), go via an edge of class HostedOn, and then onto an edge of class Depends ON, to a node of class VR (e.g., node 127) and then to a node of class VM (e.g., node 126) on any edge of any class.

As another example, a given pathway expression may include a disjunction. Pathway p may satisfy ($p_1 | p_2$) either if p satisfies $p_1$ or if p satisfies $p_2$.

The syntax of the query language may vary, as long as the syntax provides a mechanism for querying an inventory for a set of pathways. The examples provided herein are for illustration purposes only, and should not be construed as limiting the scope of the disclosed query language or any other feature of this disclosure.

A first-degree query (also referred to as a "query" or "query 214") may return a set of pathways. In an aspect, a first-degree query may identify one or more of the following elements: (1) a first element, which may be one or more pathways (or nodes or edges, which by themselves may be considered pathways) for which to solve, (2) a second element, which may be one or more views of a set of pathways over which one or more pathway variables, such as the first element, may be applied, and (3) a third element, which may include one or more conditions of one or more pathway variables. For example, query 214 received at step 255 of method 250 may comprise pathway variables.

In an aspect, the query language may use a syntax similar to that of SQL. For example, a RETRIEVE clause may identify the first element, a FROM clause may identify the second element, and a WHERE clause may identify the third element.

For example, the following query including pathway variable P:
RETRIEVE P
FROM ASC P
WHERE source(P).id=128a AND length(P)=3;
may find the ascending pathways of length 3 from node 128a, which may be the pathways to VFC nodes 124 that are deployed on node 128a. In this query, the first element may be the pathway variable P, the second element may be the set of all ascending pathways as a view of the set of all pathways, and the third element may be that pathway P has a source of node 128a and a length of 3.

As another example, the following query:
RETRIEVE P
FROM PATHWAYS P
WHERE source(P).id=128a AND length(P)=3;
may find all pathways of length 3 from node 128a, which would include pathways regardless of whether they were ascending, descending, horizontal, or of any other configuration. As another example, the following query:
RETRIEVE N
FROM NODES N
WHERE N MATCHES 'n(isa VM)';
may find all VM nodes, such as 126a, 126b, 126c, 126d, 126e, and 126f. As a node by itself may comprise a pathway, the results of this query may be a set of pathways, where each pathway is of length 0 and may comprise a single node.

Another query may retrieve edges. For example, the following query:
RETRIEVE E
FROM EDGES E
WHERE E MATCHES 'e(isa intra-layer)';
may find all intra-layer edges, such as edges 152, 154, and 156. As an edge by itself may comprise a pathway, the results of this query may be a set of pathways, where each pathway is of length 1 and may comprise a single edge. Alternatively, this query may return a set of pathways having length 1, where each pathway contains one intra-layer edge and the edge's target node and source node.

The node classes and subclasses and the edge classes and subclasses may be used to define a variable, such as by using the class name. For example, in the above query, e(isa intra-layer) defines the edge as belonging to the intra-layer class and in the preceding query, n(isa VM) defines that node as belonging to the VM class. Such classes, for example, those classes the instances of which may be part of pathways that satisfy query 214 may be referred to as query classes. Thus, for the query n(isa NodeA) (referring to NodeA 242), then NodeA 242 may be considered a query class.

However, as discussed above, query 214 may not need to identify any query class in order for query 214 to be executed. The query class may be derived based on any components, parent classes, or metadata identified by the query.

For example, a query may request all nodes that have a component, such as NODE component 239. Such a query may be satisfied by instances of NodeB 244, NodeC 246, or NodeD 248, as (1) all instances of NodeB 244 and any of its subclasses (including NodeC 246 and NodeD 248) have NODE component 239.

As another example, a query may request nodes having a ROUTER component. For example, query may be stated as n(has ROUTER). Based on the exemplary definitions of classes vrouter and vRouter, a query for nodes having the ROUTER component would be querying for instances of vrouter and vRouter. Thus, the query classes may be vrouter and vRouter.

As another example, a query may request nodes by identifying a base class and other information, such as a component. For example, the query may state such data that constitutes a generalization of a class, or a class generalization, like that the query class be derived from a parent class and include a component. For example, consider the query: n(derived_from:vnf && has ROUTER) may identify instances of the vrouter class, since the class definition of vrouter is:

```
Class vrouter{
    derived_from: vnf
    ROUTER
}
```

Thus, the query class of query n(derived_from:vnf && has ROUTER) may be vrouter.

Other metadata may be included in the query, and this metadata may be used to identify one or more query classes. For example, a user may know that developer username tjones15 created classes to identify virtual routers. Instead of recalling the names of those classes, the user may query for instances having metadata identifying user tjones15.

Such information that is not a direct identifier of a query class, but may be used to identify a query class, may be considered a class generalization. A class generalization may comprise metadata associated with the query class, fields associated with the query class, parent classes of the query class, components of the query class, or the like. Query 214 may comprise a class generalization.

In an example, query 214 may be:
RETRIEVE P
FROM P
WHERE source(P).hasa(NODE_X) AND target(P).derived_from(NodeB) AND LENGTH=2

At step 278, method 274 may include identifying a query class based on at least the class generalization. As discussed above, a comparison of the class generalization (e.g., one or more parent classes, components, or metadata) with the schema (e.g., classes, class hierarchies, components, and component hierarchies) may identify one or more query classes of query 214.

Exemplary query 214 may include two class generalizations: the node having NODE_X component 239, as used to identify the target node, and being derived from an instance of NodeB 244, as used to identify the source node. Following the schema, as illustrated in FIG. 2c, at step 278, classes Node 237, NodeA 242, NodeB 244, NodeC 246, or NodeD 248 may be the query classes based on class generalization of the node having NODE_X 239, and classes NodeC and NodeD may be the query classes based on class generalization derived_from.NodeB.

Once query classes may be substituted into the query based on the class generalizations, additional steps may be performed to execute the query on graph database 210.

A regular form of a query may be when each pathways is associated with a regular pathway expression. In an aspect, a query can be written in regular form or it can be transformed into one. (For example, this may include rewriting the query to identify the query classes in lieu of the class generalizations.) In this manner, a query can be input using a syntax (such as a user-friendly syntax, such as SQL) and may be translated into a regular pathway expression. This may be accomplished by rewriting conditions of the query in a regular pathway expression form. For example, the condition length(p)≤k, may be translated into a condition P MATCHES 'n( ){0,k}' where n( ) is a node pattern that is satisfied by any node. For example, the query:
RETRIEVE P
FROM ASC P
WHERE source(P).id=128a AND length(P)=2;
may be translated into:
RETRIEVE P
FROM ASC P
WHERE P MATCHES n(id=128a)→n( )→n( )

Also, queries may use views of all horizontal or descending pathways, such as by using the syntax HORIZONTAL and DESC, respectively, as is used by query 218. For example, these views may be included as part of the second element, or, in the exemplary syntax, the FROM clause, which contains pathway variables P, P1, and P2:
RETRIEVE P
FROM HORIZONTAL P, DESC P1, DESC P2
WHERE source(P1).id='124a' AND length(P1)=2 AND source (P2).id='124e' AND length (P2)=2 AND source (P)=target (P1) and target (P)=target (P2) AND length P<=10;
may find pathways on the physical layer between the hosts of two VNF nodes 124a and 124e. The view HORIZON- TAL P may limit P to horizontal pathways, and the views DESC P1, and DESC P2 may limit P1 and P2 to descending pathways. This query may be solved by finding pathway P1 from 124*a* and pathway P2 from 124*e* to physical layer 138, which may indicate on which host node 128 each VNF node 124*a* and 124*e* is deployed (e.g., node 128*a* and node 128*c*, respectively) and then finding horizontal pathways p between the two discovered hosts. This query uses a join to connect the three pathway variables, P, P1, and P2, by comparing the target of one pathway to the source of another pathway. The above query may be rewritten in regular form, such as:
RETRIEVE P
FROM HORIZONTAL P, DESC P1, DESC P2
WHERE P1 MATCHES 'n(id=124*a*)→n( )→n( )' AND P2 MATCHES 'n(id=124*e*)→n( )→n( )' AND source(P)=target(P1) AND target(P)=target (P2) AND P MATCHES 'n( ){0, 10}';

A query having multiple variables may be written using subqueries. In an aspect, the syntax for subqueries may follow the same structure as the syntax for queries. For example, the preceding query may be written as:
RETRIEVE P
FROM HORIZONTAL P WHERE source(P)=target(
RETRIEVE P1
FROM DESC P1
WHERE P1 MATCHES 'n(id=124*a*)→n( )→n( )') AND target(P)=target(
RETRIEVE P2
FROM DESC P2
WHERE P2 MATCHES 'n(id=124*e*)→n( )→n( )') AND P MATCHES 'n( ){0, 10}');

A query may also use Boolean functions. For example, an EXISTS clause in a query may return 'TRUE' (or 1) if that clause is true, and a NOT EXISTS clause (e.g., a negation clause) may return 'TRUE' (or 1) if that clause is false. In an aspect, negation may be expressed by using NOT EXISTS. For example, the following query:
RETRIEVE N
FROM NODES N
WHERE N MATCHES 'n(isa VM)' AND NOT EXISTS (
RETRIEVE P
FROM ASC P
WHERE source(P)=N AND length(P)<=2);
may find VM nodes 126 that do not host any VFC nodes 124 or VNF nodes 122 (as there are no ascending pathways from the returned VM nodes). This syntax assumes that ASC P only refers to pathways with lengths greater than or equal to 1, so that pathways of length zero—which, by definition, any node N may qualify—would not cause the NOT EXISTS query to return false. If the syntax uses ASC P such that it includes pathways of length 0, the same query could be expressed by adding "AND length (P)>0" to the WHERE clause of the RETRIEVE P subquery, such as:
RETRIEVE N
FROM NODES N
WHERE N MATCHES 'n(isa VM)' AND NOT EXISTS (
RETRIEVE P
FROM ASC P
WHERE source(P)=N AND length(P)<=2 AND length(P)>0);

Negation may be used to discover the shortest pathways between given nodes. For example, the following query:
RETRIEVE P
FROM P
WHERE P MATCHES 'n(id=128*a*)→n( ){0,5}→n (id=124*d*)' AND NOT EXISTS
(RETRIEVE P1
FROM P1
WHERE P1 MATCHES 'n(id=128*a*)→n( ){0,8}→n (id=124*d*)' AND length (P1)<length (P))
may return the shortest pathways between nodes 128*a* and 124*d*.

A query may use or identify induced pathways. A set of induced pathways of a given pathway may be defined by a query element, such as a pair of induction patterns. Induction patterns may be represented as regular pathway expressions. One induction pattern may be used for the vertical traversal, to move between layers. Another induction pattern may be used for the horizontal traversal in the new layer. A query for induced pathways may be expressed by the operation ZOOM_IN(P, RPE_v, RPE_h) or ZOOM_OUT(P, RPE_v, RPE_h), where P may be a pathway variable representing the sequence $v_1, e_1, v_2, e_2, \ldots, v_{k-1}, e_{k-1}, v_k$. RPE_v may be a vertical pathway expression, and RPE_h may be a horizontal pathway expression. The pathway expressions RPE_v and RPE_h may be used as follows for computing induced pathways. For a zoom-in operation, at a first step, the nodes reachable by vi from a pathway that matches RPE_v are computed, for each $v_i$ of P. For a zoom-out operation, at a first step, the nodes from which $v_i$ is reachable by a pathway that matches RPE_v are computed, for each $v_i$ of P. Let $Z_1, \ldots Z_k$ denote the result node sets from the first step. That is, for a zoom-in operation, $Z_j$ may be the set of nodes accessible by $v_j$ from a pathway that satisfies RPE_v, and for a zoom-out operation, $Z_j$ may be the set of nodes from which $v_j$ is accessible from a pathway that satisfies RPE_v. An induced path is a sequence $p_i = w_i, \ldots w_n$ such that there is a subsequence of k nodes $w_{i1}, \ldots w_{ik}$, where $w_{ij}$ is in $Z_j$, for all $1 \leq j \leq k$, and each pair $w_{ij}, w_{ij+1}$ is connected by a horizontal pathway that matches RPE_h. In other words, for each pair $w_{ij}, w_{ij+1}$ there is a subsequence of consecutive nodes and edges $w_{ij}, e_{ij}, \ldots e_{ij+1}$ in $p_i$ that forms a horizontal pathway matching RPE_h. For example, the following induced-pathway query:
RETRIEVE ZOOM_IN(P, 'n( )→n(isa VFC)→n(isa VM)', 'n( ){0,4}')
FROM HORIZONTAL P
WHERE P MATCHES 'n(id=122*a*)→n(id=122*c*)→n (id=122*d*)'

In this query, the nodes reachable by vi (e.g., the nodes of P) by a pathway that matches 'n( )→n(isa VFC)→n(isa VM)' is as follows: For $v_1$ (122*a*), $Z_1$ includes 126*a*; for $v_2$ (122*c*), $Z_2$ includes 126*d*; and for $v_3$ (122*d*), $Z_3$ includes 126*d*. Next, the induced paths that include $Z_1$, $Z_2$, or $Z_3$, where each pair of nodes from $Z_1$, $Z_2$, or $Z_3$ may be connected by a horizontal pathway that matches n( ){0,4} are identified. Thus, if px is an induced pathway returned by the above query, px includes 126*a* and 126*d* (the nodes in $Z_1$, $Z_2$, or $Z_3$). Then, each of 126*a* and 126*d* may be connected by a horizontal pathway that satisfies n( ){0,4}. For example, $p_x$ may be the sequence 126*a*, 146*a*, 126*b*, 146*c*, 126*c*, 146*d*, 127, 146*e*, 126*d*. In this pathway $p_x$, 126*a* is connected to 126*d* by a pathway of length 3 (which satisfies n( ){0,4}). Another induced pathway may be the sequence 126*a*, 146*b*, 126*c*, 146*d*, 127, 146*e*, 126*d*, where 126*a* is connected by a pathway of length 2 (which satisfies n( ){0,4}). In this manner, this exemplary induced-pathway query may drill down from service layer 132 to find VM nodes 126 that are connected to the VNF nodes 122 of pathway P through a vertical pathway of VFC, VM. Then, on virtualization layer 136 it may find horizontal pathways having lengths less than or equal to 4 that connect those VM nodes.

Generally, an induced-pathway query may return a pathway whose first node and last node are part of any of $Z_j$. In an aspect, modified induced pathway queries may return pathways that start or end with nodes besides those nodes in any of $Z_j$. For example, another induced pathway $p_x$ may be the sequence 126*b*, 146*a*, 126*a*, 146*b*, 126*c*, 146*d*, 127, 146*e*, 126*d*; and another induced pathway $p_x$ may be the sequence 126*a*, 146*b*, 126*c*, 146*d*, 127, 146*e*, 126*d*, 146*f*, 126*e*, 146*g*, 126*f* Generally, an induced-pathway query may return a horizontal query. As another option, a modified induced-pathway query may be used to find induced pathways that are not horizontal. For example, an induced pathway $p_x$ may be 128*a*, 156*a*, 126*a*, 146*a*, 126*b*, 146*c*, 126*c*, 146*d*, 127, 146*e*, 126*d*.

At step 280, method 274 may include determining anchor sets based on the pathway variables of the query. An anchor set may be a set of nodes that may be used as an initial node set in the identification of pathways. The size of an anchor set may vary. For example, the anchor set size may be based on the size of the network or the size of the query. In an aspect, using a larger anchor set for a larger network may provide more accurate or more reliable query results. Optionally, the anchor set size may be based on the available computation resources. In an aspect, a larger anchor set may require more computation resources, so queries performed when resources are in high demand, or queries performed where the speed of determining the query results is of greater importance, may use smaller anchor sets. Given an anchor set A and a length limit L, an anchored length-limited set of pathways ("ALLP") may be a set of pathways such that all pathways in the set go via a node in A their length does not exceed L.

For example, consider the query:
RETRIEVE P
FROM HORIZONTAL P, DESC P1, DESC P2
WHERE P1 MATCHES 'n(id=124*a*)→n( )→n( )' AND P2 MATCHES 'n(id=124*e*)→n( )→n( )' AND source(P)=target(P1) AND target(P)=target (P2) AND P MATCHES 'n( ){0, 10}';
The pathway variables may include P, P1, and P2. The anchor set for each pathway variable may be determined. An anchor set may be directly defined, such as for variable P1, which has a condition that its source node be node 124*a*, and variable P2, which has a condition that its source node be node 124*e*. Thus, the anchor set for P1 may be node 124*a*, and the anchor set for P2 may be node 124*e*.

Method 274 may include identifying an evaluation order based on the anchor set. An evaluation order, which may comprise a graph $G_A(Q)$ whose nodes are the variables of query Q. For example, for the exemplary query, the evaluation order may comprise a graph $G_A(Q)$ whose nodes are P, P1, and P2. Variables whose anchor set is directly defined, like P1 and P2, may be considered roots. Pairs of variables with a join condition may connected by an edge in $G_A(Q)$. For example, source(P)=target(P1) may be a join condition, and target(P)=target(P2) may be another join condition. Thus, P and P1 may be connected by an edge, and P and P2 may be connected by another edge. An evaluation order may be an order that is computed by a traversal over $G_A(Q)$ in which nodes that are not roots can only be visited if they are neighbors of a visited node. Thus, in the exemplary $G_A(Q)$, the node P may only be visited if it is the neighbor of a visited node, which means that at least one of P1 or P2 must be visited before P is visited. Thus, an order in which P is after P1 or P2 may be used as an evaluation order. That is, the order may be (1) P1, P2, P; (2) P1, P, P2; (3) P2, P1, P; or (4) P2, P, P1.

At step 282, method 274 may include translating the query into one or more pathway algebraic expressions based on at least the query class and the anchor set. In general, a pathway variable p whose anchor set may be A and whose length limit is L, the pathway algebraic expression may be of the form $$E_p = \varepsilon^{y_j}(\varepsilon^{L-j}(A)),$$

where $\varepsilon'$ may be an reverse extension (discussed below), $\varepsilon$ may be an extension (discussed below), and j may be determined according to the location of the anchor. For example, j may equal 0 when the anchor A is the source, and j may equal L when the anchor A is the target. For a pathway variable $p_x$ that uses an anchor extracted from p, the pathway algebraic expression may be of the form $$E_{px} = \varepsilon^{y_j}{}_{S2}(\varepsilon^{L-j}{}_{S2}(\eta_n(E_p))),$$

where j is the location of the anchor in px and n is the extracted node (e.g., source node, target node, or node i).

A pathway algebra may operate on sets of pathways or tables of pathways. A table of pathways may be a table whose rows are tuples of pathways. A tuple may be a list of pathways that are related in some sense. For example, a table of pathways may be used where the query comprises multiple pathway variables. Returning to exemplary query:
RETRIEVE P
FROM HORIZONTAL P, DESC P1, DESC P2
WHERE P1 MATCHES 'n(id=124*a*)→n( )→n( )' AND P2 MATCHES 'n(id=124*e*)→n( )→n( )' AND source(P)=target(P1) AND target(P)=target (P2) AND P MATCHES 'n( ){0, 10}';
a table of pathways may be constructed where each column is a set of pathways associated with one of the pathway variables (e.g., P1, P2, and P), and where pathways in a row are related to one another. For example, in a given row, the source of P may be the target of P1 or the target of P may be the target of P2.

In pathway algebra, for unary operators, the operand may be a set of pathways or a table of pathways, and, for binary operators, the operand may be a pair of pathway sets or a pair of tables.

In pathway algebra, an extension operator is a unary operator that may be used to extend pathways by appending to them an edge, or an edge and its target node. The extension operator may receive a set of pathways or a table of pathways.

When the extension operator is applied to a set of pathways S, it may be denoted by $\varepsilon(S)$. The extension operator may add S to the result and then add the following pathways. For each pathway p in S and edge e in the network, such that the source of e is equal to the target of p, the concatenation of p and e—for example, (p||e)—or, in cases where the extension operator appends an edge and its target node to the pathway, (p||e, $e_{target}$), may be added to the result. For example, considering FIG. 1*b*, if the set of pathways S is the single pathway p=128*a*, 156*a*, 126*a*, then $\varepsilon(S)$ may be equal to the set comprising (1) p; (2) 128*a*, 156*a*, 126*a*, 146*b*, 126*c*; (3) 128*a*, 156*a*, 126*a*, 146*a*, 126*b*; and (4) 128*a*, 156*a*, 126*a*, 154*a*, 124*a*.

When the input of an extension operator is a table T and the operation is to be applied to column i of the table, the operation may denoted by $\varepsilon_{S_i}(T)$. In such case, a row r whose pathway in column i can be extended by k different edges may yield k+1 rows of result—one for each extension plus the original tuple with the unexpanded pathway.

An ascending extension operator $\varepsilon_{asc}$ may extend pathways by merely ascending edges, and the descending extension operator $\varepsilon_{desc}$ may extend pathways by merely descending edges. Similarly, the horizontal extension operator $\varepsilon_{horizontal}$ may extend pathways by merely horizontal edges.

In pathway algebra, a reverse extension operator is a unary operator that may be used to extend pathways by appending the pathways to an edge when the target of the edge is equal to the source of the pathway. The reverse extension operator may work similar to the extension operator, except that instead of concatenating an edge to a pathway, a pathway is concatenated to an edge, or an edge and its source node. For each pathway p in S and edge e in the network, such that the target of e is equal to the source of p, the concatenation of e and p—for example, (e∥p)—or, in cases where the reverse extension operator appends the pathway to an edge and its source node, (p∥e, $e_{target}$), may be added to the result. A reverse extension operation may be denoted by $\varepsilon'$. For example, considering FIG. 1b, if the set of pathways S is the single pathway p=128a, 156a, 126a, then $\varepsilon'$(S) may be equal to the set comprising (1) p; (2) 128b, 148a, 128a, 156a, 126a; (3) 126c, 156c, 128a, 156a, 126a; (4) 126b, 156b, 128a, 156a, 126a; and (5) 128c, 148d, 128a, 156a, 126a. When the input of a reverse extension operator is a table T and the operation is to be applied to column i of the table, the operation may denoted by $\varepsilon_{\$i}'$(T). In such case, a row r whose pathway in column i can be extend by k different edges may yield k+1 rows of result—one for each extension plus the original tuple with the unexpanded pathway.

In pathway algebra, a node extraction operator is a unary operator that extracts a single node, such as the source node, the target node, or the jth node, from each pathway in a given set. The node extraction operator may be applied to a set or on a column i of a table. The node extraction operator may add a new column that associates each pathway to its extracted node. The new column may contain a set of nodes and, hence, a set of pathways (when a single node may be considered pathway). The node extraction operator is denoted by $\eta$, such that extracting a source node, target node, or jth node from a set may be denoted as $\eta_{source}$(S), $\eta_{target}$(S), or $\eta_{node(j)}$(S), respectively, and extracting a source node, target node, or jth node from a column i or T may be denoted as $\eta_{\$i,source}$(T), $\eta_{\$i,target}$(T), or $\eta_{\$i,node(j)}$(T), respectively. The new column added by node extraction operator may be the last column, so the new column of a node extraction operator applied to set S is column 2, and the new column of a node extraction operator applied to a table T having n columns, the new column will be column n+1.

Pathway algebra may include standard operators of relational algebra, such as the Cartesian product (denoted by ×), projection (denoted by $\pi$), selection (denoted by $\sigma$) and set operators (unions, intersections, complements), may be applied on tables of pathways consistent with relational algebra.

For example, the following pathway algebraic expression may find VMs that are not the source of any ascending pathway by defining variable N as VM nodes, finding the nodes of N with ascending pathways, and using set difference to discard those nodes of N with ascending pathways:

N←node(class='VM')
N\\$\pi_{\$2}(\eta_{source}(\varepsilon_{asc}^2(N)))$

Thus, for this example, the algebraic expressions may be:

$$E_{P1}=\varepsilon_{desc}^2(\text{node}(id=124a))$$

$$E_{P2}=\varepsilon_{desc}^2(\text{node}(id=124e))$$

$$E_{PX}=\varepsilon_{horizontal}^{10}(\eta_{target}(E_{P1})),$$

where $E_{P1}$, $E_{P2}$, and $E_{PX}$ are pathway algebraic expressions for variables P1, P2, and P, respectively.

In the above example, the pathway algebraic expressions follow the $E_p=\varepsilon^{-j}(\varepsilon^{L-j}(A))$ format, where the $E_{PX}$ formula uses the anchor set from $P_1$. However, $P_2$ may be another anchor set for P. Thus, another pathway algebraic expression for the P variable may be:

$E_{PY}=\varepsilon'_{horizontal}{}^{10}(\eta_{target}(E_{P2}))$. Whether P1 or P2 is used as the anchor set of the pathway algebraic expression for P may depend upon the evaluation order. For example, whichever pathway variable is used as the anchor set of P must precede P in the evaluation order. Of the possible evaluation orders—(1) P1, P2, P; (2) P1, P, P2; (3) P2, P1, P; or (4) P2, P, P1—if the evaluation order (2) is selected, then P1 may be the anchor set for P, and if evaluation order (4) is selected, then P2 may be the anchor set for P. If the evaluation order (1) or (3) is selected, either P2 or P1 may be the anchor set for P, as both are evaluated prior to P. For this example, algebraic expression $E_{PX}$ is used, but $E_{PY}$ may be been used to achieve the same query results.

Expressions that may be computed for the different pathways may be combined using a Cartesian product, and selections may be applied with the conditions in the WHERE clause. For example, the pathway expressions for $E_{P1}$, $E_{P2}$, and $E_{PX}$ may be combined as the expression:

$$E_{P1} \times E_{P2} \times E_{PX}$$

$$\varepsilon_{desc}^2(\text{node}(id=124a)) \times \varepsilon_{horizontal}^{10}(\eta_{target}(\varepsilon_{desc}^2(\text{node}(id=124a)))) \times \varepsilon_{desc}^2(\text{node}(id=124e))$$

This pathway algebraic expression may return a table whose first column includes set of pathways defined by $E_{P1}$, a second column that includes a set of pathways defined by $E_{P2}$, and a third column that includes a set of pathways defined by $E_{PX}$, whose rows are tuples of each of the pathways of $E_{P1}$, each of the pathways of $E_{P2}$, and each of the pathways of $E_{PX}$.

Optionally, optimization techniques may be applied to speed up the evaluation of queries. As a first example, pathways that may only be computed to provide an anchor for some other pathway and are then discarded may be called a navigational anchor variable. A navigational anchor variable may be a pathway variable that appears in the FROM clause without appearing in the RETRIEVE clause and where one its nodes may be an anchor of another pathway. This may require extracting the anchor, but there may be not need to keep the pathway from which the anchor is extracted. Thus, the operator $\eta$ can be combined with the projection $\pi$, which may leave only the column of the extracted nodes after the operation. Additionally or alternatively, the Cartesian product of the pathway expressions may only include as operands those pathway expression whose variables are not navigational anchor variables.

An example of a navigational anchor variable in query 218 is P1, if the algebraic expression for P uses the algebraic expression of P1 as the anchor (e.g., $E_{PX}$). Thus, rather than using the Cartesian product $E_{P1} \times E_{P2} \times E_{PX}$, the Cartesian product may be limited to $E_{P2} \times E_{PX}$, as follows:

$$\sigma_{length=2}(\varepsilon_{desc}^2(\text{node}(id=124e))) \times \varepsilon_{horizontal}^{10}(\eta_{target}(\varepsilon_{desc}^2(\text{node}(id=124a))))$$

Selection operators may be applied to the expression based on conditions in the WHERE clause of query 218, and then a projection operator may be applied to the expression to retrieve the set of pathways that satisfy the variable in the RETRIEVE clause of query 218.

The WHERE clause of query 218 includes a number of conditions. For example, query 218 requires that both P1 and P2 are pathways of length 2. But, $E_{P1}$ and $E_{P1}$ may both return pathways whose lengths are less than or equal to 2. Thus, $E_{P1}$ and $E_{P2}$ can be modified to include a selection for pathways whose lengths equal 2:

$$E_{P1} = \sigma_{length=2}(\varepsilon_{desc}^2(\text{node}(id=124a)))$$

$$E_{P2} = \sigma_{length=2}(\varepsilon_{desc}^2(\text{node}(id=124a)))$$

Inserting these updated $E_{P1}$ and $E_P$ expressions in to the Cartesian product $E_{P2} \times E_{PX}$ may result in:

$$\sigma_{length=2}(\varepsilon_{desc}^2(\text{node}(id=124e))) \times \varepsilon_{horizontal}^{10}(\eta_{target}(\sigma_{length=2}(\varepsilon_{desc}^2(\text{node}(id=124a)))))$$

The identification of pathways with a length requirement may be another grounds for optimizing the evaluation. For example, when, for pathway variable p, there exists a length limit length(p)=L, there may be no need to compute pathways whose length is less than L, only to discard them when the selection operator is applied. In such case, the extend operator may be combined with a selection operator, such that in each application of ε(S) or ε'(S), only extensions of pathways of S are added to the result. The unexpanded original pathways of S may be discarded.

Since query 218 provides that P can be pathways having a length up to 10, no such length-dependent selection may be necessary for $E_P$, as the maximum length of a pathway returned by $\varepsilon_{horizontal}^{10}$ is 10. However, query 218 requires that P include pathways whose source nodes are the target nodes of P1 and whose target nodes are the target of P2. Query 218 includes the condition that the source of the pathways of P equal the targets of the pathways of P1. The condition that pathways P have a source node that is the target node of P1 may be satisfied by $E_{PX}$. The condition that the targets of pathways P equal the targets of the pathways P1 may be incorporated into the algebraic expression using a selection operator, as follows:

$$\sigma_{target(\$1)=target(\$2)}(\sigma_{length=2}(\varepsilon_{desc}^2(\text{node}(id=124e))) \times \varepsilon_{horizontal}^{10}(\eta_{target}(\sigma_{length=2}(\varepsilon_{desc}^2(\text{node}(id=124a))))))$$

Finally, a projection may be applied on the pathway variables in the retrieve clause—for example, P—as follows:

$$\pi_{\$1}(\sigma_{target(\$1)=target(\$2)}(\sigma_{length=2}(\varepsilon_{desc}^2(\text{node}(id=124e))) \times \varepsilon_{horizontal}^{10}(\eta_{target}(\sigma_{length=2}(\varepsilon_{desc}^2(\text{node}(id=124a))))))$$

In another example, for queries that may contain a NOT EXISTS subquery, for each row of the Cartesian product, the anchors that may be used in the subquery may be extracted using the node extraction operator and the sub-query may be computed with respect to them. The condition may be evaluated as true of the result of the subquery is non-empty and false if the result of the subquery is empty.

As another example of optimization techniques, when an extend operator is applied, it may be desired to only apply it using specific edges. For instance, when a pathway is limited to be horizontal, ascending, or descending, the extend operator may be executed with respect to merely horizontal, ascending, or descending edges, respectively. A more intricate case may be when the computed pathways should match a given regular pathway expression x. In that case, a state machine (DFA) $A_x$ that accepts only pathways complying with x may be built, and only extensions by edges that are a valid step on the automation may be executed.

At step 284, method 274 may include executing the pathway algebraic expressions on graph database 219 to identify a first pathway. As stated above, valid evaluation orders may include: (1) P1, P2, P; (2) P1, P, P2; (3) P2, P1, P; or (4) P2, P, P1. The evaluation order at step 265 may be selected from the valid evaluation orders. Optionally, how the pathway algebraic expressions are executed may depend on the evaluation order. For this example, assume that evaluation order (1) was chosen. Thus, the first pathway algebraic expression to be executed may be $E_{P1}$.

Executing $E_{P1} = \sigma_{length=2}(\varepsilon_{desc}^2(\text{node}(id=124a)))$ on database 210 may return $S_{P1} = \{124a, 154a, 126a, 156a, 128a\}$.

Then, $E_{P2}$ may be executed on database 210. Executing $E_{P2} = \sigma_{length=2}(\varepsilon_{desc}^2(\text{node}(id=124e)))$ may return $S_{P2} = \{124e, 154e, 126e, 156e, 128c\}$ Then, the results of $E_{P1}$ and $E_{P2}$ may be inserted into the expression for pathway P:

$$\pi_{\$1}(\sigma_{target(\$1)=target(\$2)}(S_{P2} \times \varepsilon_{horizontal}^{10}(\eta_{target}(S_{P1})))),$$

which may be executed on database 210.

Since the only target node of $S_1$ is 128a, and the only target node of 128b is 128c, the results of executing $\pi_{\$1}(\sigma_{target(\$1)=target(\$2)}(\varepsilon_{horizontal}^{10}(\eta_{target}(S_{P1}))=S_{P2}))$ may include the set $S_P = \{128a, 148a, 128b, 148b, 128c; 128a, 148a, 128b, 148e, 128d, 148c, 128c; 128a, 148a, 128c\}$. Executing the pathway algebraic expression on graph database may return a pathway set, in this case, $S_P$.

The result of a first-degree may be a set of pathways. A first-degree query may be applied to the results of another first-degree query. This may maintain the composability of the query language. Additionally, second-degree queries may be applied to first-degree queries. The difference between a first-degree query and a second-degree query may be that the results of a second-degree query may not a set of pathways. Because the query language considers pathways a first-class citizen, second-degree pathways may be considered outside of the query language.

Optionally in implementations where a single edge may not be considered a pathway, queries for returning edges (such as the exemplary query above that retrieves intra-layer edges), may be considered second-degree queries. Similarly, in implementations where a single node may not be considered a pathway, queries for returning nodes (such as the exemplary query above that returns VM nodes), may be considered second-degree queries.

For example, second-degree queries may return other data related to a set of pathways (e.g., the results of a first-degree query), such as the number of pathways in the set, the types of nodes or edges in the set, or any other data. The following examples illustrate how second-degree queries may function.

For example, a second-degree query may comprise a count function that may count the number of retrieved pathways. For example, the following second-degree query:
COUNT(
RETRIEVE P
FROM ASC P
WHERE source(P)=128a AND length(P)<3)
may return 7, since the first-degree query returns 7 pathways: (1) 128a; (2) 128a 156a, 126a; (3) 128a, 156a, 126a, 154a, 124a; (4) 128a, 156b, 126b; (5) 128a, 156b, 126b, 154b, 124b; (6) 128a, 156c, 126c; and (7) 128a, 156c, 126c, 154c, 124c.

As another example, a second-degree query may include an intersect function that may extract the nodes (or edges) that may be shared by all the returned pathways. An intersect function may be useful for identifying a potential common (or single) point of failure, which may be helpful for troubleshooting. For example, the following second-degree query:

INTERSECT_NODES(
RETRIEVE P
FROM DESC P
WHERE target(P)=126*d* AND LENGTH P=2)
may return 124*d* and 126*d*, since the first-degree query returns pathways (1) 122*c*, 152*c*, 124*d*, 154*d*, 126*d*; and (2) 122*d*, 152*d*, 124*d*, 154*d*, 126*d*, whose shared nodes are 124*d* and 126*d*. Similarly, the following second-degree query:

INTERSECT_EDGES(
RETRIEVE P
FROM DESC P
WHERE target(P)=126*d* AND LENGTH P=2)
may return 154*d*, which is the only edge shared by the two returned pathways. In an aspect, INTERSECT( ) may be the combination of INTERSECT_NODES( ) and INTERSECT_EDGES( ) so that the following second-degree query:

INTERSECT_NODES(
RETRIEVE P
FROM DESC P
WHERE target(P)=126*d* AND LENGTH P=2)
may return 124*d*, 126*d*, and 154*d*.

As another example, a second-degree query may include a minimum length function that may find the length of the shortest pathway in the set. For example, the following second-degree query:

MIN_LENGTH( RETRIEVE P
FROM HORIZONTAL P
WHERE target (P)=126*a* AND SOURCE(P)=126*c*)
may return 3, since of the two horizontal pathways starting at 126*a* and ending at 126*c*-126*a*, 146*a*, 126*b*, 146*c*, 126*c* and 126*a*, 146*b*, 126*c*, the shortest pathway is the latter, with a length of 1.

As another example, a second-degree query may include a join function over two pathway sets, which may return a concatenation of every pathway of the first set and every pathway of the second set whenever the target of the first pathway is equal to the source of the second pathway. For example, the following second-degree query:

JOIN (
(RETRIEVE P
FROM HORIZONTAL P
WHERE source (P)=126*c* AND length (P)>=1),
(RETRIEVE P1
FROM ASC P1
WHERE source(P1)=126*d* AND length (P1)>=1))
requires computing the query for P and the query for P1. P may include the following pathways: (1) 126*c*, 146*d*, 127; (2) 126*c*, 146*d*, 127, 146*e*, 126*d*; (3) 126*c*, 146*d*, 127, 146*e*, 126*d*, 146*f*, 126*e*; (4) 126*c*, 146*d*, 127, 146*e*, 126*d*, 146*f*, 126*e*, 146*g*, 126*f*; (5) 126*c*, 146*c*, 126*b*; (6) 126*c*, 146*c*, 126*b*, 146*a*, 126*a*; and (7) 126*c*, 146*b*, 126*a*. P1 may include the following pathways: (A) 126*d*, 154*d*, 124*c*, 152*c*, 122*c*; (B) 126*d*, 154*d*, 124*d*; and (C) 126*d*, 154*d*, 124*d*, 152*d*, 122*d*. Then, JOIN (P, P1) may produce the set of the following concatenations (2, A), (2, B), (2, C), or the following pathways (1) 126*c*, 146*d*, 127, 146*e*, 126*d*, 154*d*, 124*c*, 152*c*, 122*c*; (2) 126*c*, 146*d*, 127, 146*e*, 126*d*, 154*d*, 124*d*; and (3) 126*c*, 146*d*, 127, 146*e*, 126*d*, 154*d*, 124*d*, 152*d*, 122*d*.

As another example, a second-degree query may include an extract function that extracts elements present in any of the pathways in the set. EXTRACT_NODES (P) may return all nodes that are present in any of the pathways of set P. For example, applying a second degree function to the first-degree query used in the COUNT( ) to identify all nodes in the set of pathways returned by the first-degree query may be written as:

EXTRACT_NODES(
RETRIEVE P
FROM ASC P
WHERE source(P)=128*a* AND length(P)<3)
This query may return all the nodes found in any of the seven pathways P: 128*a*; 126*a*; 124*a*, 126*b*, 124*b*; 126*c*, and 124*c*. Note that, because nodes may be considered pathways of length 0, that the EXTRACT_NODES query may be considered as a first-degree query. Similarly, a second-degree query applied to the same first-degree query may identify all edges that are included in the set of pathways returned by the first-degree query. This may be written as:

EXTRACT_EDGES(
RETRIEVE P
FROM ASC P
WHERE source(P)=128*a* AND length(P)<3)
This second-degree query may return all the nodes found in any of the seven pathways P: 156*a*, 154*a*, 156*b*, 154*b*, 156*c*, and 154*c*. Note that, because edges may be considered pathways of length 1, that the EXTRACT_EDGES query may be considered as a first-degree query.

Similarly, second-degree queries may return information other than nodes or edges. For example, as discussed above, a network inventory may include information on items that are related to network 100 but are not part of network 100 itself, such as suppliers of physical components, customers, and their usage of network functions, or employees who are maintaining network 100. As an example, different extract functions may extract this type of data. For example, an extract function may be used to identify employees responsible for maintaining one or more nodes or edges of a pathway set P. Likewise, different intersect functions may be used to identify employees that are responsible for at least one node or one edge in every pathway of set P.

Figure 3:
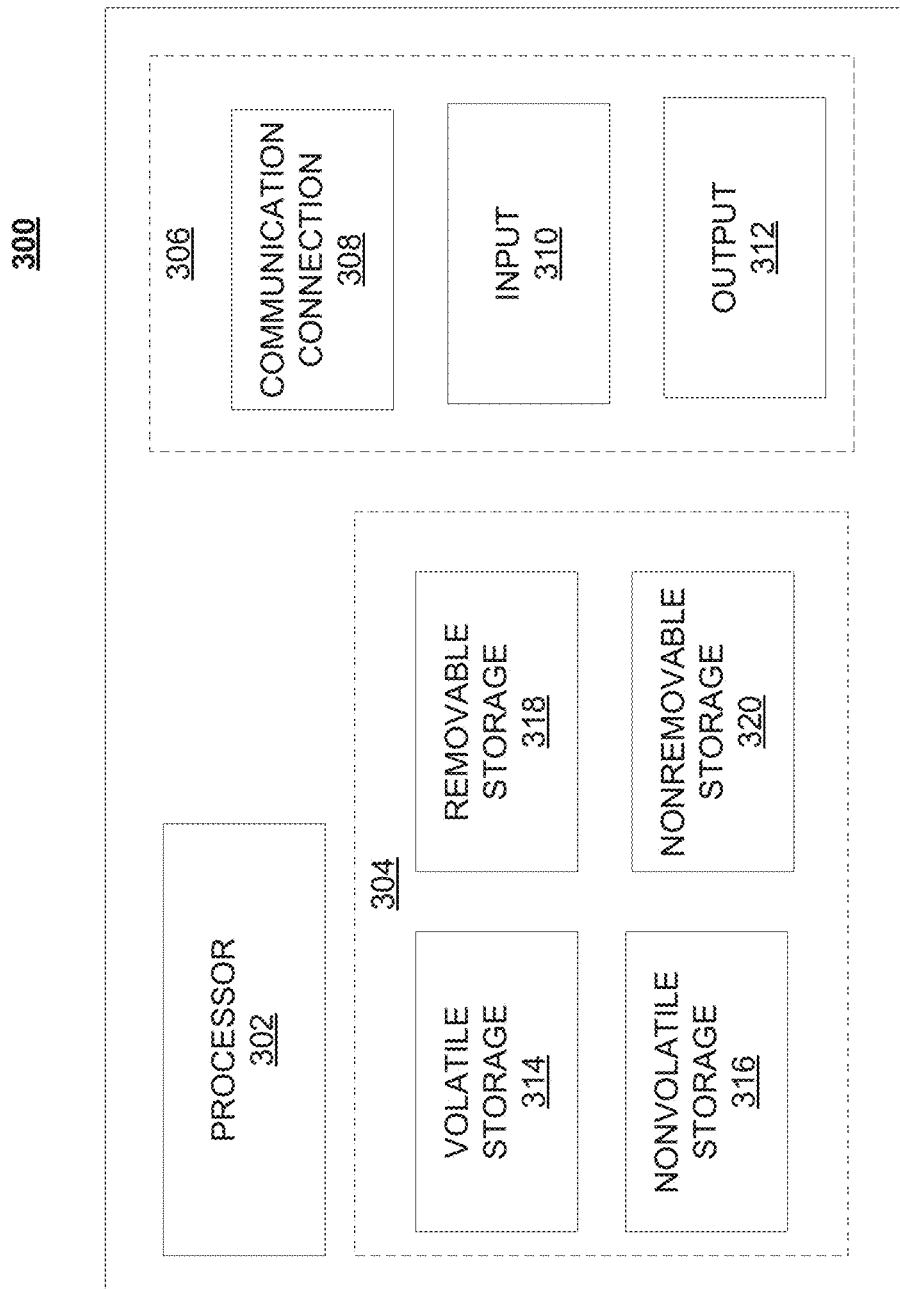

FIG. 3 is a block diagram of network device 300 that may be connected to or comprise a component of network 100 or system 200. Network device 300 may comprise hardware or a combination of hardware and software. The functionality to facilitate telecommunications via a telecommunications network may reside in one or combination of network devices 300. Network device 300 depicted in FIG. 3 may represent or perform functionality of an appropriate network device 300, or combination of network devices 300, such as, for example, a component or various components of a cellular broadcast system wireless network, a processor, a server, a gateway, a node, a mobile switching center (MSC), a short message service center (SMSC), an ALFS, a gateway mobile location center (GMLC), a radio access network (RAN), a serving mobile location center (SMLC), or the like, or any appropriate combination thereof. It is emphasized that the block diagram depicted in FIG. 3 is exemplary and not intended to imply a limitation to a specific implementation or configuration. Thus, network device 300 may be implemented in a single device or multiple devices (e.g., single server or multiple servers, single gateway or multiple gateways, single controller or multiple controllers). Multiple network entities may be distributed or centrally located. Multiple network entities may communicate wirelessly, via hard wire, or any appropriate combination thereof.

Network device 300 may comprise a processor 302 and a memory 304 coupled to processor 302. Memory 304 may contain executable instructions that, when executed by processor 302, cause processor 302 to effectuate operations associated with mapping wireless signal strength. As evident from the description herein, network device 300 is not to be construed as software per se.

In addition to processor 302 and memory 304, network device 300 may include an input/output system 306. Processor 302, memory 304, and input/output system 306 may be coupled together (coupling not shown in FIG. 3) to allow communications therebetween. Each portion of network device 300 may comprise circuitry for performing functions associated with each respective portion. Thus, each portion may comprise hardware, or a combination of hardware and software. Accordingly, each portion of network device 300 is not to be construed as software per se. Input/output system 306 may be capable of receiving or providing information from or to a communications device or other network entities configured for telecommunications. For example input/output system 306 may include a wireless communications (e.g., 3G/4G/GPS) card. Input/output system 306 may be capable of receiving or sending video information, audio information, control information, image information, data, or any combination thereof. Input/output system 306 may be capable of transferring information with network device 300. In various configurations, input/output system 306 may receive or provide information via any appropriate means, such as, for example, optical means (e.g., infrared), electromagnetic means (e.g., RF, Wi-Fi, Bluetooth®, ZigBee®), acoustic means (e.g., speaker, microphone, ultrasonic receiver, ultrasonic transmitter), or a combination thereof. In an example configuration, input/output system 306 may comprise a Wi-Fi finder, a two-way GPS chipset or equivalent, or the like, or a combination thereof.

Input/output system 306 of network device 300 also may contain a communication connection 308 that allows network device 300 to communicate with other devices, network entities, or the like. Communication connection 308 may comprise communication media. Communication media typically embody computer-readable instructions, data structures, program modules or other data in a modulated data signal such as a carrier wave or other transport mechanism and includes any information delivery media. By way of example, and not limitation, communication media may include wired media such as a wired network or direct-wired connection, or wireless media such as acoustic, RF, infrared, or other wireless media. The term computer-readable media as used herein includes both storage media and communication media. Input/output system 306 also may include an input device 310 such as keyboard, mouse, pen, voice input device, or touch input device. Input/output system 306 may also include an output device 312, such as a display, speakers, or a printer.

Processor 302 may be capable of performing functions associated with telecommunications, such as functions for processing broadcast messages, as described herein. For example, processor 302 may be capable of, in conjunction with any other portion of network device 300, determining a type of broadcast message and acting according to the broadcast message type or content, as described herein.

Memory 304 of network device 300 may comprise a storage medium having a concrete, tangible, physical structure. As is known, a signal does not have a concrete, tangible, physical structure. Memory 304, as well as any computer-readable storage medium described herein, is not to be construed as a signal. Memory 304, as well as any computer-readable storage medium described herein, is not to be construed as a transient signal. Memory 304, as well as any computer-readable storage medium described herein, is not to be construed as a propagating signal. Memory 304, as well as any computer-readable storage medium described herein, is to be construed as an article of manufacture.

Memory 304 may store any information utilized in conjunction with telecommunications. Depending upon the exact configuration or type of processor, memory 304 may include a volatile storage 314 (such as some types of RAM), a nonvolatile storage 316 (such as ROM, flash memory), or a combination thereof. Memory 304 may include additional storage (e.g., a removable storage 318 or a nonremovable storage 320) including, for example, tape, flash memory, smart cards, CD-ROM, DVD, or other optical storage, magnetic cassettes, magnetic tape, magnetic disk storage or other magnetic storage devices, USB-compatible memory, or any other medium that can be used to store information and that can be accessed by network device 300. Memory 304 may comprise executable instructions that, when executed by processor 302, cause processor 302 to effectuate operations to map signal strengths in an area of interest.

Figure 4:
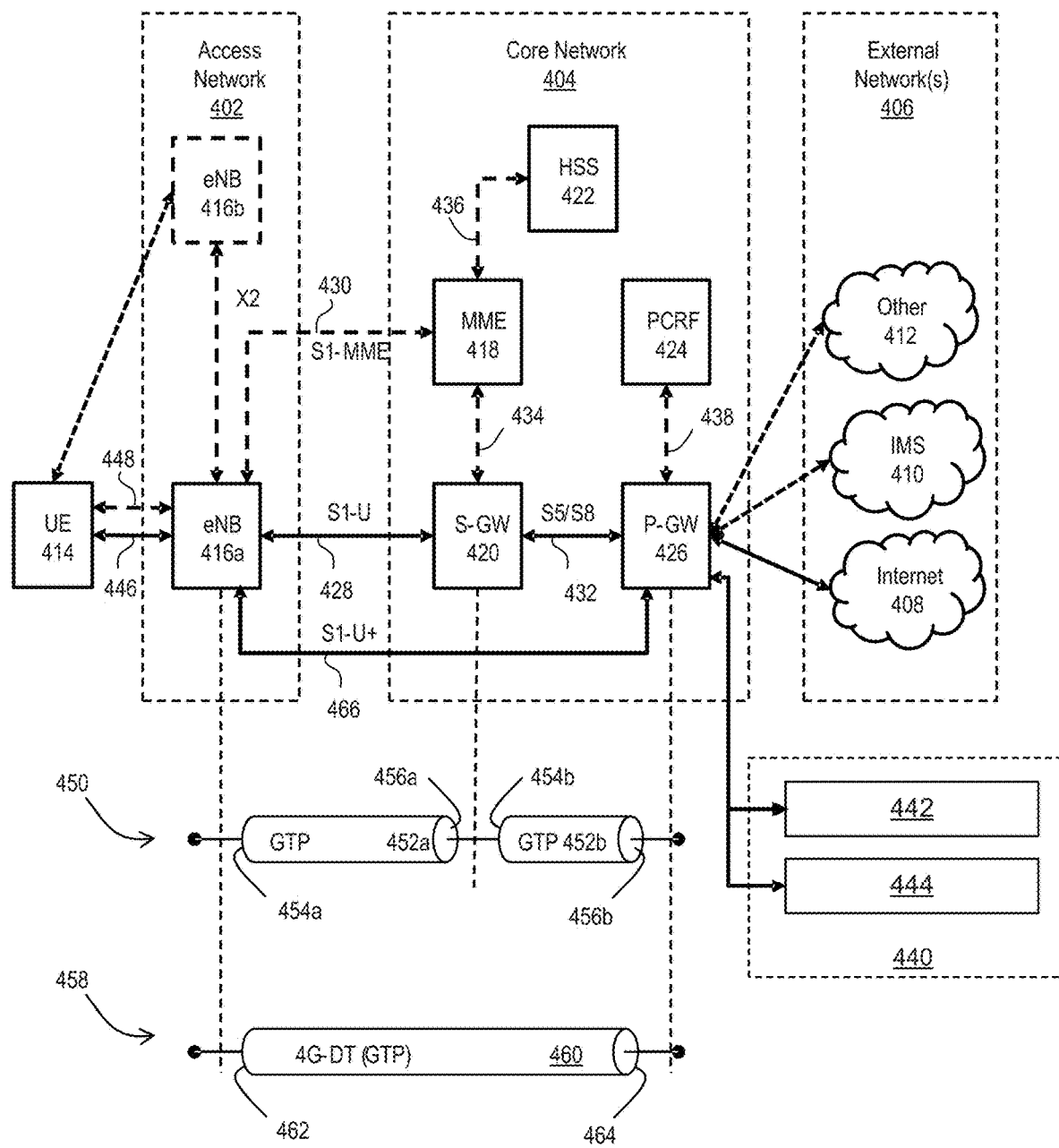
FIG. 4 depicts an exemplary communication system that provide wireless telecommunication services over wireless communication networks that may be modeled using the disclosed systems and methods for creating a graph database.

FIG. 4 illustrates a functional block diagram depicting one example of an LTE-EPS network architecture 400 related to the current disclosure. For example, network architecture 400 may include network 100. The network architecture 400 disclosed herein is referred to as a modified LTE-EPS architecture 400 to distinguish it from a traditional LTE-EPS architecture.

An example modified LTE-EPS architecture 400 is based at least in part on standards developed by the 3rd Generation Partnership Project (3GPP), with information available at www.3gpp.org. In one embodiment, the LTE-EPS network architecture 400 includes an access network 402, a core network 404, e.g., an EPC or Common BackBone (CBB) and one or more external networks 406, sometimes referred to as PDN or peer entities. Different external networks 406 can be distinguished from each other by a respective network identifier, e.g., a label according to DNS naming conventions describing an access point to the PDN. Such labels can be referred to as Access Point Names (APN). External networks 406 can include one or more trusted and non-trusted external networks such as an internet protocol (IP) network 408, an IP multimedia subsystem (IMS) network 410, and other networks 412, such as a service network, a corporate network, or the like. In an aspect, access network 402, core network 404, or external network 405 may include or communicate with network 100.

Access network 402 can include an LTE network architecture sometimes referred to as Evolved Universal mobile Telecommunication system Terrestrial Radio Access (E UTRA) and evolved UMTS Terrestrial Radio Access Network (E-UTRAN). Broadly, access network 402 can include one or more communication devices, commonly referred to as UE 414, and one or more wireless access nodes, or base stations 416a, 416b. During network operations, at least one base station 416 communicates directly with UE 414. Base station 416 can be an evolved Node B (e-NodeB), with which UE 414 communicates over the air and wirelessly. UEs 414 can include, without limitation, wireless devices, e.g., satellite communication systems, portable digital assistants (PDAs), laptop computers, tablet devices and other mobile devices (e.g., cellular telephones, smart appliances, and so on). UEs 414 can connect to eNBs 416 when UE 414 is within range according to a corresponding wireless communication technology.

UE 414 generally runs one or more applications that engage in a transfer of packets between UE 414 and one or more external networks 406. Such packet transfers can include one of downlink packet transfers from external network 406 to UE 414, uplink packet transfers from UE 414 to external network 406 or combinations of uplink and downlink packet transfers. Applications can include, without limitation, web browsing, VoIP, streaming media and the like. Each application can pose different Quality of Service (QoS) requirements on a respective packet transfer. Different packet transfers can be served by different bearers within core network 404, e.g., according to parameters, such as the QoS.

Core network 404 uses a concept of bearers, e.g., EPS bearers, to route packets, e.g., IP traffic, between a particular gateway in core network 404 and UE 414. A bearer refers generally to an IP packet flow with a defined QoS between the particular gateway and UE 414. Access network 402, e.g., E UTRAN, and core network 404 together set up and release bearers as required by the various applications. Bearers can be classified in at least two different categories: (i) minimum guaranteed bit rate bearers, e.g., for applications, such as VoIP; and (ii) non-guaranteed bit rate bearers that do not require guarantee bit rate, e.g., for applications, such as web browsing.

In one embodiment, the core network 404 includes various network entities, such as MME 418, SGW 420, Home Subscriber Server (HSS) 422, Policy and Charging Rules Function (PCRF) 424 and PGW 426. In one embodiment, MME 418 comprises a control node performing a control signaling between various equipment and devices in access network 402 and core network 404. The protocols running between UE 414 and core network 404 are generally known as Non-Access Stratum (NAS) protocols.

For illustration purposes only, the terms MME 418, SGW 420, HSS 422 and PGW 426, and so on, can be server devices, but may be referred to in the subject disclosure without the word "server." It is also understood that any form of such servers can operate in a device, system, component, or other form of centralized or distributed hardware and software. It is further noted that these terms and other terms such as bearer paths and/or interfaces are terms that can include features, methodologies, and/or fields that may be described in whole or in part by standards bodies such as the 3GPP. It is further noted that some or all embodiments of the subject disclosure may in whole or in part modify, supplement, or otherwise supersede final or proposed standards published and promulgated by 3GPP.

According to traditional implementations of LTE-EPS architectures, SGW 420 routes and forwards all user data packets. SGW 420 also acts as a mobility anchor for user plane operation during handovers between base stations, e.g., during a handover from first eNB 416*a* to second eNB 416*b* as may be the result of UE 414 moving from one area of coverage, e.g., cell, to another. SGW 420 can also terminate a downlink data path, e.g., from external network 406 to UE 414 in an idle state, and trigger a paging operation when downlink data arrives for UE 414. SGW 420 can also be configured to manage and store a context for UE 414, e.g., including one or more of parameters of the IP bearer service and network internal routing information. In addition, SGW 420 can perform administrative functions, e.g., in a visited network, such as collecting information for charging (e.g., the volume of data sent to or received from the user), and/or replicate user traffic, e.g., to support a lawful interception. SGW 420 also serves as the mobility anchor for interworking with other 3GPP technologies such as universal mobile telecommunication system (UMTS).

At any given time, UE 414 is generally in one of three different states: detached, idle, or active. The detached state is typically a transitory state in which UE 414 is powered on but is engaged in a process of searching and registering with network 402. In the active state, UE 414 is registered with access network 402 and has established a wireless connection, e.g., radio resource control (RRC) connection, with eNB 416. Whether UE 414 is in an active state can depend on the state of a packet data session, and whether there is an active packet data session. In the idle state, UE 414 is generally in a power conservation state in which UE 414 typically does not communicate packets. When UE 414 is idle, SGW 420 can terminate a downlink data path, e.g., from one peer entity 406, and triggers paging of UE 414 when data arrives for UE 414. If UE 414 responds to the page, SGW 420 can forward the IP packet to eNB 416*a*.

HSS 422 can manage subscription-related information for a user of UE 414. For example, HSS 422 can store information such as authorization of the user, security requirements for the user, quality of service (QoS) requirements for the user, etc. HSS 422 can also hold information about external networks 406 to which the user can connect, e.g., in the form of an APN of external networks 406. For example, MME 418 can communicate with HSS 422 to determine if UE 414 is authorized to establish a call, e.g., a voice over IP (VoIP) call before the call is established.

PCRF 424 can perform QoS management functions and policy control. PCRF 424 is responsible for policy control decision-making, as well as for controlling the flow-based charging functionalities in a policy control enforcement function (PCEF), which resides in PGW 426. PCRF 424 provides the QoS authorization, e.g., QoS class identifier and bit rates that decide how a certain data flow will be treated in the PCEF and ensures that this is in accordance with the user's subscription profile.

PGW 426 can provide connectivity between the UE 414 and one or more of the external networks 406. In illustrative network architecture 400, PGW 426 can be responsible for IP address allocation for UE 414, as well as one or more of QoS enforcement and flow-based charging, e.g., according to rules from the PCRF 424. PGW 426 is also typically responsible for filtering downlink user IP packets into the different QoS-based bearers. In at least some embodiments, such filtering can be performed based on traffic flow templates. PGW 426 can also perform QoS enforcement, e.g., for guaranteed bit rate bearers. PGW 426 also serves as a mobility anchor for interworking with non-3GPP technologies such as CDMA2000.

Within access network 402 and core network 404 there may be various bearer paths/interfaces, e.g., represented by solid lines 428 and 430. Some of the bearer paths can be referred to by a specific label. For example, solid line 428 can be considered an S1-U bearer and solid line 432 can be considered an S5/S8 bearer according to LTE-EPS architecture standards. Without limitation, reference to various interfaces, such as S1, X2, S5, S8, S11 refer to EPS interfaces. In some instances, such interface designations are combined with a suffix, e.g., a "U" or a "C" to signify whether the interface relates to a "User plane" or a "Control plane." In addition, the core network 404 can include various signaling bearer paths/interfaces, e.g., control plane paths/interfaces represented by dashed lines 430, 434, 436, and 438. Some of the signaling bearer paths may be referred to by a specific label. For example, dashed line 430 can be considered as an S1-MME signaling bearer, dashed line 434 can be considered as an S11 signaling bearer and dashed line 436 can be considered as an S6a signaling bearer, e.g., according to LTE-EPS architecture standards. The above bearer paths and signaling bearer paths are only illustrated as examples and it should be noted that additional bearer paths and signaling bearer paths may exist that are not illustrated.

Also shown is a novel user plane path/interface, referred to as the S1-U+ interface 466. In the illustrative example, the S1-U+ user plane interface extends between the eNB 416a and PGW 426. Notably, S1-U+ path/interface does not include SGW 420, a node that is otherwise instrumental in configuring and/or managing packet forwarding between eNB 416a and one or more external networks 406 by way of PGW 426. As disclosed herein, the S1-U+ path/interface facilitates autonomous learning of peer transport layer addresses by one or more of the network nodes to facilitate a self-configuring of the packet forwarding path. In particular, such self-configuring can be accomplished during handovers in most scenarios so as to reduce any extra signaling load on the S/PGWs 420, 426 due to excessive handover events.

In some embodiments, PGW 426 is coupled to storage device 440, shown in phantom. Storage device 440 can be integral to one of the network nodes, such as PGW 426, for example, in the form of internal memory and/or disk drive. It is understood that storage device 440 can include registers suitable for storing address values. Alternatively or in addition, storage device 440 can be separate from PGW 426, for example, as an external hard drive, a flash drive, and/or network storage.

Storage device 440 selectively stores one or more values relevant to the forwarding of packet data. For example, storage device 440 can store identities and/or addresses of network entities, such as any of network nodes 418, 420, 422, 424, and 426, eNBs 416 and/or UE 414. In the illustrative example, storage device 440 includes a first storage location 442 and a second storage location 444. First storage location 442 can be dedicated to storing a Currently Used Downlink address value 442. Likewise, second storage location 444 can be dedicated to storing a Default Downlink Forwarding address value 444. PGW 426 can read and/or write values into either of storage locations 442, 444, for example, managing Currently Used Downlink Forwarding address value 442 and Default Downlink Forwarding address value 444 as disclosed herein.

In some embodiments, the Default Downlink Forwarding address for each EPS bearer is the SGW S5-U address for each EPS Bearer. The Currently Used Downlink Forwarding address" for each EPS bearer in PGW 426 can be set every time when PGW 426 receives an uplink packet, e.g., a GTP-U uplink packet, with a new source address for a corresponding EPS bearer. When UE 414 is in an idle state, the "Current Used Downlink Forwarding address" field for each EPS bearer of UE 414 can be set to a "null" or other suitable value.

In some embodiments, the Default Downlink Forwarding address is only updated when PGW 426 receives a new SGW S5-U address in a predetermined message or messages. For example, the Default Downlink Forwarding address is only updated when PGW 426 receives one of a Create Session Request, Modify Bearer Request and Create Bearer Response messages from SGW 420.

As values 442, 444 can be maintained and otherwise manipulated on a per bearer basis, it is understood that the storage locations can take the form of tables, spreadsheets, lists, and/or other data structures generally well understood and suitable for maintaining and/or otherwise manipulate forwarding addresses on a per bearer basis.

It should be noted that access network 402 and core network 404 are illustrated in a simplified block diagram in FIG. 4. In other words, either or both of access network 402 and the core network 404 can include additional network elements that are not shown, such as various routers, switches and controllers. In addition, although FIG. 4 illustrates only a single one of each of the various network elements, it should be noted that access network 402 and core network 404 can include any number of the various network elements. For example, core network 404 can include a pool (i.e., more than one) of MMEs 418, SGWs 420 or PGWs 426.

In the illustrative example, data traversing a network path between UE 414, eNB 416a, SGW 420, PGW 426 and external network 406 may be considered to constitute data transferred according to an end-to-end IP service. However, for the present disclosure, to properly perform establishment management in LTE-EPS network architecture 400, the core network, data bearer portion of the end-to-end IP service is analyzed.

An establishment may be defined herein as a connection set up request between any two elements within LTE-EPS network architecture 400. The connection set up request may be for user data or for signaling. A failed establishment may be defined as a connection set up request that was unsuccessful. A successful establishment may be defined as a connection set up request that was successful.

In one embodiment, a data bearer portion comprises a first portion (e.g., a data radio bearer 446) between UE 414 and eNB 416a, a second portion (e.g., an S1 data bearer 428) between eNB 416a and SGW 420, and a third portion (e.g., an S5/S8 bearer 432) between SGW 420 and PGW 426. Various signaling bearer portions are also illustrated in FIG. 4. For example, a first signaling portion (e.g., a signaling radio bearer 448) between UE 414 and eNB 416a, and a second signaling portion (e.g., S1 signaling bearer 430) between eNB 416a and MME 418.

In at least some embodiments, the data bearer can include tunneling, e.g., IP tunneling, by which data packets can be forwarded in an encapsulated manner, between tunnel endpoints. Tunnels, or tunnel connections can be identified in one or more nodes of network 400, e.g., by one or more of tunnel endpoint identifiers, an IP address and a user datagram protocol port number. Within a particular tunnel connection, payloads, e.g., packet data, which may or may not include protocol related information, are forwarded between tunnel endpoints.

An example of first tunnel solution 450 includes a first tunnel 452a between two tunnel endpoints 454a and 456a, and a second tunnel 452b between two tunnel endpoints 454b and 456b. In the illustrative example, first tunnel 452a is established between eNB 416a and SGW 420. Accordingly, first tunnel 452a includes a first tunnel endpoint 454a corresponding to an S1-U address of eNB 416a (referred to herein as the eNB S1-U address), and second tunnel endpoint 456a corresponding to an S1-U address of SGW 420 (referred to herein as the SGW S1-U address). Likewise, second tunnel 452b includes first tunnel endpoint 454b corresponding to an S5-U address of SGW 420 (referred to herein as the SGW S5-U address), and second tunnel endpoint 456b corresponding to an S5-U address of PGW 426 (referred to herein as the PGW S5-U address).

In at least some embodiments, first tunnel solution 450 is referred to as a two tunnel solution, e.g., according to the GPRS Tunneling Protocol User Plane (GTPv1-U based), as described in 3GPP specification TS 29.281, incorporated herein in its entirety. It is understood that one or more tunnels are permitted between each set of tunnel end points. For example, each subscriber can have one or more tunnels, e.g., one for each PDP context that they have active, as well as possibly having separate tunnels for specific connections with different quality of service requirements, and so on.

An example of second tunnel solution 458 includes a single or direct tunnel 460 between tunnel endpoints 462 and 464. In the illustrative example, direct tunnel 460 is established between eNB 416a and PGW 426, without subjecting packet transfers to processing related to SGW 420. Accordingly, direct tunnel 460 includes first tunnel endpoint 462 corresponding to the eNB S1-U address, and second tunnel endpoint 464 corresponding to the PGW S5-U address. Packet data received at either end can be encapsulated into a payload and directed to the corresponding address of the other end of the tunnel. Such direct tunneling avoids processing, e.g., by SGW 420 that would otherwise relay packets between the same two endpoints, e.g., according to a protocol, such as the GTP-U protocol.

In some scenarios, direct tunneling solution 458 can forward user plane data packets between eNB 416a and PGW 426, by way of SGW 420. That is, SGW 420 can serve a relay function, by relaying packets between two tunnel endpoints 416a, 426. In other scenarios, direct tunneling solution 458 can forward user data packets between eNB 416a and PGW 426, by way of the S1 U+ interface, thereby bypassing SGW 420.

Generally, UE 414 can have one or more bearers at any one time. The number and types of bearers can depend on applications, default requirements, and so on. It is understood that the techniques disclosed herein, including the configuration, management and use of various tunnel solutions 450, 458, can be applied to the bearers on an individual bases. That is, if user data packets of one bearer, say a bearer associated with a VoIP service of UE 414, then the forwarding of all packets of that bearer are handled in a similar manner. Continuing with this example, the same UE 414 can have another bearer associated with it through the same eNB 416a. This other bearer, for example, can be associated with a relatively low rate data session forwarding user data packets through core network 404 simultaneously with the first bearer. Likewise, the user data packets of the other bearer are also handled in a similar manner, without necessarily following a forwarding path or solution of the first bearer. Thus, one of the bearers may be forwarded through direct tunnel 458; whereas, another one of the bearers may be forwarded through a two-tunnel solution 450.

Figure 5:
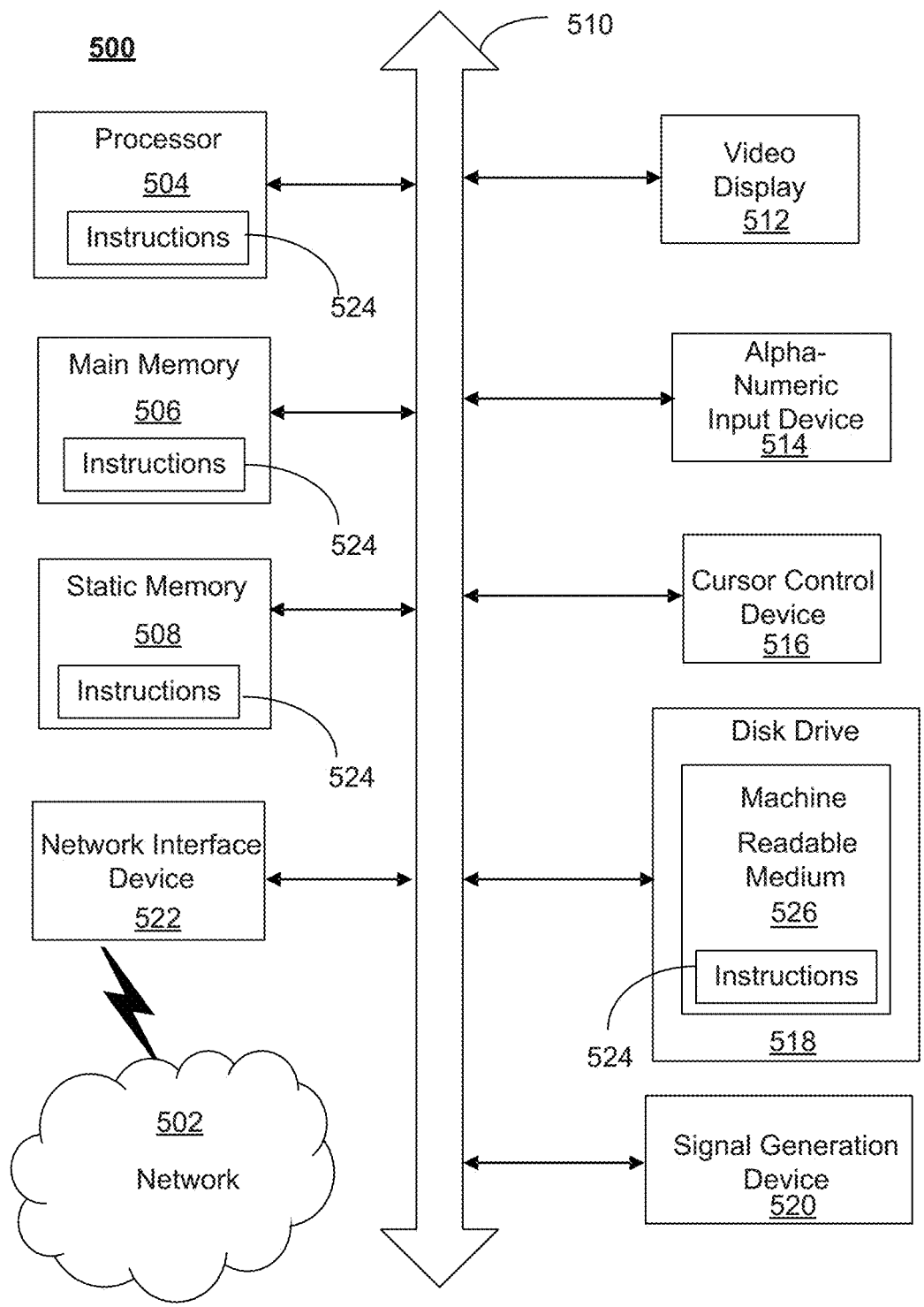
FIG. 5 depicts an exemplary communication system that provide wireless telecommunication services over wireless communication networks that may be modeled using the disclosed systems and methods for creating a graph database.

FIG. 5 depicts an exemplary diagrammatic representation of a machine in the form of a computer system 500 within which a set of instructions, when executed, may cause the machine to perform any one or more of the methods described above. One or more instances of the machine can operate, for example, as processor 302, UE 414, eNB 416, MME 418, SGW 420, HSS 422, PCRF 424, PGW 426 and other devices of FIGS. 1, 2, and 4. In some embodiments, the machine may be connected (e.g., using a network 502) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

Computer system 500 may include a processor (or controller) 504 (e.g., a central processing unit (CPU)), a graphics processing unit (GPU, or both), a main memory 506 and a static memory 508, which communicate with each other via a bus 510. The computer system 500 may further include a display unit 512 (e.g., a liquid crystal display (LCD), a flat panel, or a solid state display). Computer system 500 may include an input device 514 (e.g., a keyboard), a cursor control device 516 (e.g., a mouse), a disk drive unit 518, a signal generation device 520 (e.g., a speaker or remote control) and a network interface device 522. In distributed environments, the embodiments described in the subject disclosure can be adapted to utilize multiple display units 512 controlled by two or more computer systems 500. In this configuration, presentations described by the subject disclosure may in part be shown in a first of display units 512, while the remaining portion is presented in a second of display units 512.

The disk drive unit 518 may include a tangible computer-readable storage medium 526 on which is stored one or more sets of instructions (e.g., software 524) embodying any one or more of the methods or functions described herein, including those methods illustrated above. Instructions 524 may also reside, completely or at least partially, within main memory 506, static memory 508, or within processor 504 during execution thereof by the computer system 500. Main memory 506 and processor 504 also may constitute tangible computer-readable storage media.

Figure 6:
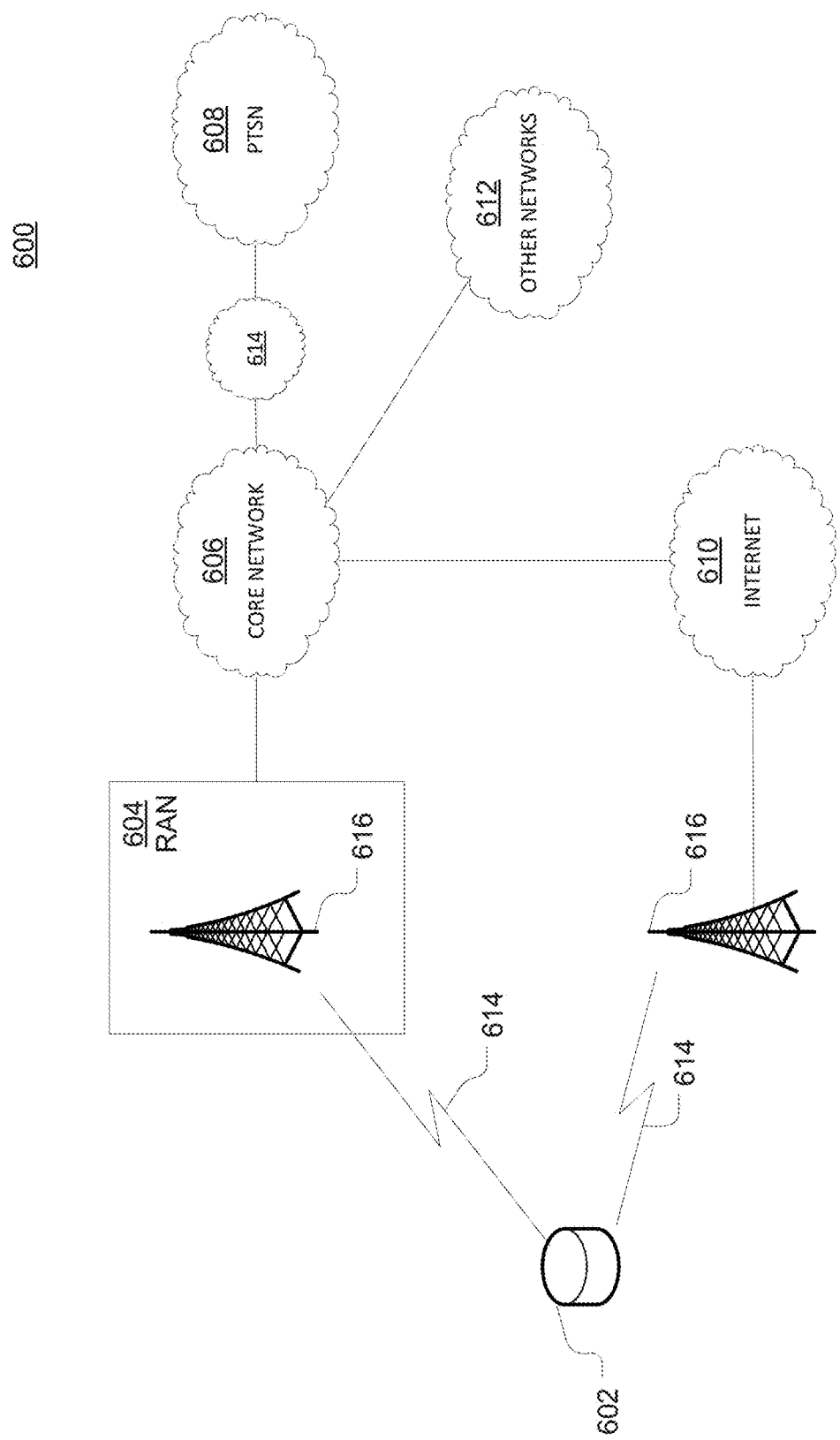
FIG. 6 is a diagram of an exemplary telecommunications system in which the disclosed methods and processes may be implemented.

As shown in FIG. 6, telecommunication system 600 may include wireless transmit/receive units (WTRUs) 602, a RAN 604, a core network 606, a public switched telephone network (PSTN) 608, the Internet 610, or other networks 612, though it will be appreciated that the disclosed examples contemplate any number of WTRUs, base stations, networks, or network elements. Each WTRU 602 may be any type of device configured to operate or communicate in a wireless environment. For example, a WTRU may comprise drone 102, a mobile device, network device 300, or the like, or any combination thereof. By way of example, WTRUs 602 may be configured to transmit or receive wireless signals and may include a UE, a mobile station, a mobile device, a fixed or mobile subscriber unit, a pager, a cellular telephone, a PDA, a smartphone, a laptop, a netbook, a personal computer, a wireless sensor, consumer electronics, or the like. WTRUs 602 may be configured to transmit or receive wireless signals over an air interface 614.

Telecommunication system 600 may also include one or more base stations 616. Each of base stations 616 may be any type of device configured to wirelessly interface with at least one of the WTRUs 602 to facilitate access to one or more communication networks, such as core network 606, PTSN 608, Internet 610, or other networks 612. By way of example, base stations 616 may be a base transceiver station (BTS), a Node-B, an eNode B, a Home Node B, a Home eNode B, a site controller, an access point (AP), a wireless router, or the like. While base stations 616 are each depicted as a single element, it will be appreciated that base stations 616 may include any number of interconnected base stations or network elements.

RAN 604 may include one or more base stations 616, along with other network elements (not shown), such as a base station controller (BSC), a radio network controller (RNC), or relay nodes. One or more base stations 616 may be configured to transmit or receive wireless signals within a particular geographic region, which may be referred to as a cell (not shown). The cell may further be divided into cell sectors. For example, the cell associated with base station 616 may be divided into three sectors such that base station 616 may include three transceivers: one for each sector of the cell. In another example, base station 616 may employ multiple-input multiple-output (MIMO) technology and, therefore, may utilize multiple transceivers for each sector of the cell.

Base stations 616 may communicate with one or more of WTRUs 602 over air interface 614, which may be any suitable wireless communication link (e.g., RF, microwave, infrared (IR), ultraviolet (UV), or visible light). Air interface 614 may be established using any suitable radio access technology (RAT).

More specifically, as noted above, telecommunication system 600 may be a multiple access system and may employ one or more channel access schemes, such as CDMA, TDMA, FDMA, OFDMA, SC-FDMA, or the like. For example, base station 616 in RAN 604 and WTRUs 602 connected to RAN 604 may implement a radio technology such as Universal Mobile Telecommunications System (UMTS) Terrestrial Radio Access (UTRA) that may establish air interface 614 using wideband CDMA (WCDMA). WCDMA may include communication protocols, such as High-Speed Packet Access (HSPA) or Evolved HSPA (HSPA+). HSPA may include High-Speed Downlink Packet Access (HSDPA) or High-Speed Uplink Packet Access (HSUPA).

As another example base station 616 and WTRUs 602 that are connected to RAN 604 may implement a radio technology such as Evolved UMTS Terrestrial Radio Access (E-UTRA), which may establish air interface 614 using LTE or LTE-Advanced (LTE-A).

Optionally base station 616 and WTRUs 602 connected to RAN 604 may implement radio technologies such as IEEE 602.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), GSM, Enhanced Data rates for GSM Evolution (EDGE), GSM EDGE (GERAN), or the like.

Base station 616 may be a wireless router, Home Node B, Home eNode B, or access point, for example, and may utilize any suitable RAT for facilitating wireless connectivity in a localized area, such as a place of business, a home, a vehicle, a campus, or the like. For example, base station 616 and associated WTRUs 602 may implement a radio technology such as IEEE 602.11 to establish a wireless local area network (WLAN). As another example, base station 616 and associated WTRUs 602 may implement a radio technology such as IEEE 602.15 to establish a wireless personal area network (WPAN). In yet another example, base station 616 and associated WTRUs 602 may utilize a cellular-based RAT (e.g., WCDMA, CDMA2000, GSM, LTE, LTE-A, etc.) to establish a picocell or femtocell. As shown in FIG. 6, base station 616 may have a direct connection to Internet 610. Thus, base station 616 may not be required to access Internet 610 via core network 606.

RAN 604 may be in communication with core network 606, which may be any type of network configured to provide voice, data, applications, and/or voice over internet protocol (VoIP) services to one or more WTRUs 602. For example, core network 606 may provide call control, billing services, mobile location-based services, pre-paid calling, Internet connectivity, video distribution or high-level security functions, such as user authentication. Although not shown in FIG. 6, it will be appreciated that RAN 604 or core network 606 may be in direct or indirect communication with other RANs that employ the same RAT as RAN 604 or a different RAT. For example, in addition to being connected to RAN 604, which may be utilizing an E-UTRA radio technology, core network 606 may also be in communication with another RAN (not shown) employing a GSM radio technology.

Core network 606 may also serve as a gateway for WTRUs 602 to access PSTN 608, Internet 610, or other networks 612. PSTN 608 may include circuit-switched telephone networks that provide plain old telephone service (POTS). For LTE core networks, core network 606 may use IMS core 614 to provide access to PSTN 608. Internet 610 may include a global system of interconnected computer networks or devices that use common communication protocols, such as the transmission control protocol (TCP), user datagram protocol (UDP), or IP in the TCP/IP internet protocol suite. Other networks 612 may include wired or wireless communications networks owned or operated by other service providers. For example, other networks 612 may include another core network connected to one or more RANs, which may employ the same RAT as RAN 604 or a different RAT.

Some or all WTRUs 602 in telecommunication system 600 may include multi-mode capabilities. That is, WTRUs 602 may include multiple transceivers for communicating with different wireless networks over different wireless links. For example, one or more WTRUs 602 may be configured to communicate with base station 616, which may employ a cellular-based radio technology, and with base station 616, which may employ an IEEE 802 radio technology.

Figure 7:
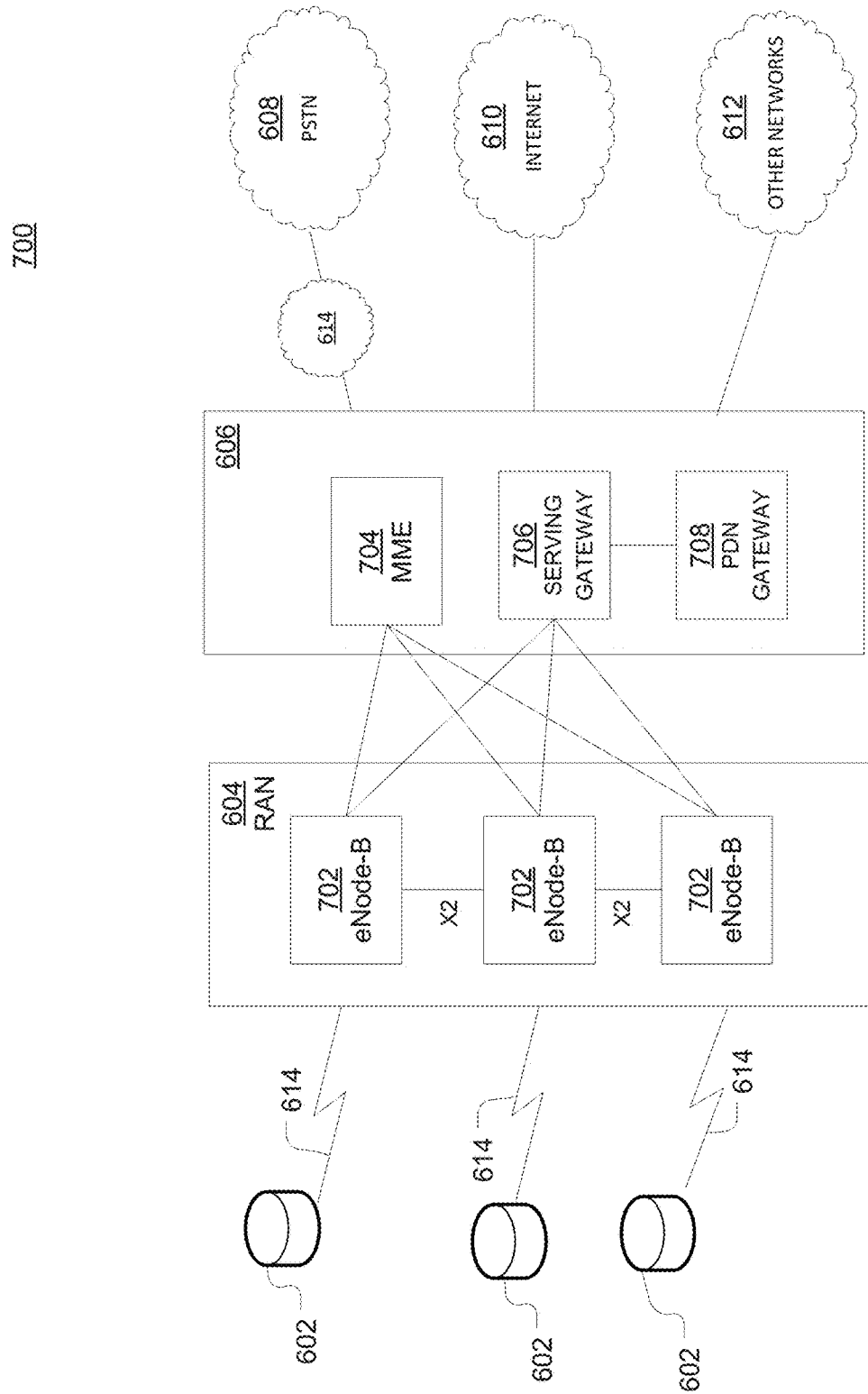
FIG. 7 is an example system diagram of a radio access network and a core network that may be modeled using the disclosed systems and methods for creating a graph database.

FIG. 7 is an example system 400 including RAN 604 and core network 606. As noted above, RAN 604 may employ an E-UTRA radio technology to communicate with WTRUs 602 over air interface 614. RAN 604 may also be in communication with core network 606.

RAN 604 may include any number of eNode-Bs 702 while remaining consistent with the disclosed technology. One or more eNode-Bs 702 may include one or more transceivers for communicating with the WTRUs 602 over air interface 614. Optionally, eNode-Bs 702 may implement MIMO technology. Thus, one of eNode-Bs 702, for example, may use multiple antennas to transmit wireless signals to, or receive wireless signals from, one of WTRUs 602.

Each of eNode-Bs 702 may be associated with a particular cell (not shown) and may be configured to handle radio resource management decisions, handover decisions, scheduling of users in the uplink or downlink, or the like. As shown in FIG. 7 eNode-Bs 702 may communicate with one another over an X2 interface.

Core network 606 shown in FIG. 7 may include a mobility management gateway or entity (MME) 704, a serving gateway 706, or a packet data network (PDN) gateway 708. While each of the foregoing elements are depicted as part of core network 606, it will be appreciated that any one of these elements may be owned or operated by an entity other than the core network operator.

MME 704 may be connected to each of eNode-Bs 702 in RAN 604 via an S1 interface and may serve as a control node. For example, MME 704 may be responsible for authenticating users of WTRUs 602, bearer activation or deactivation, selecting a particular serving gateway during an initial attach of WTRUs 602, or the like. MME 704 may also provide a control plane function for switching between RAN 604 and other RANs (not shown) that employ other radio technologies, such as GSM or WCDMA.

Serving gateway 706 may be connected to each of eNode-Bs 702 in RAN 604 via the S1 interface. Serving gateway 706 may generally route or forward user data packets to or from the WTRUs 602. Serving gateway 706 may also perform other functions, such as anchoring user planes during inter-eNode B handovers, triggering paging when downlink data is available for WTRUs 602, managing or storing contexts of WTRUs 602, or the like.

Serving gateway 706 may also be connected to PDN gateway 708, which may provide WTRUs 602 with access to packet-switched networks, such as Internet 610, to facilitate communications between WTRUs 602 and IP-enabled devices.

Core network 606 may facilitate communications with other networks. For example, core network 606 may provide WTRUs 602 with access to circuit-switched networks, such as PSTN 608, such as through IMS core 614, to facilitate communications between WTRUs 602 and traditional landline communications devices. In addition, core network 606 may provide the WTRUs 602 with access to other networks 612, which may include other wired or wireless networks that are owned or operated by other service providers.

Figure 8:
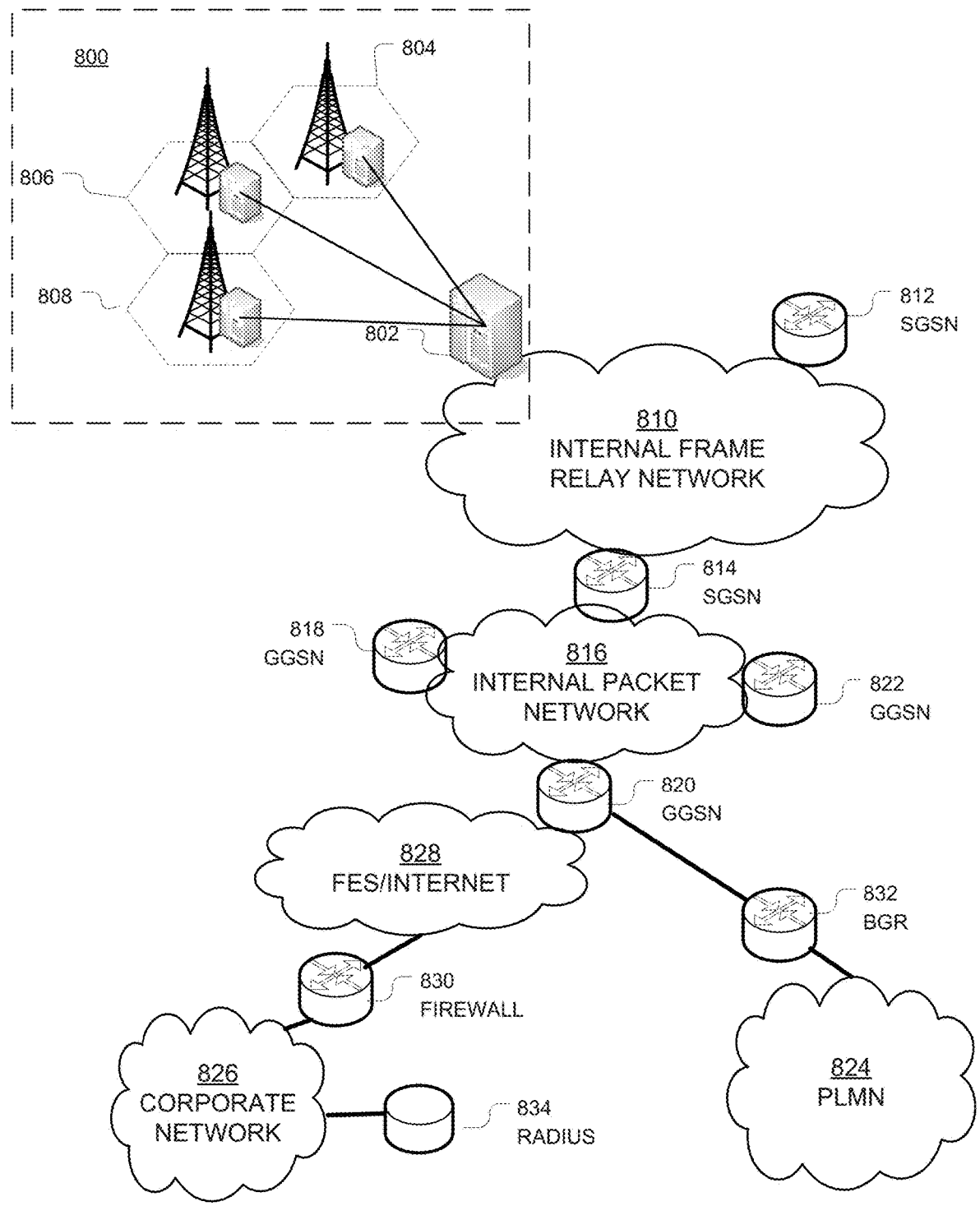
FIG. 8 depicts an overall block diagram of an example packet-based mobile cellular network environment, such as a general packet radio service (GPRS) network that may be modeled using the disclosed systems and methods for creating a graph database.

FIG. 8 depicts an overall block diagram of an example packet-based mobile cellular network environment, such as a GPRS network as described herein. In the example packet-based mobile cellular network environment shown in FIG. 8, there are a plurality of base station subsystems (BSS) 800 (only one is shown), each of which comprises a base station controller (BSC) 802 serving a plurality of BTSs, such as BTSs 804, 806, 808. BTSs 804, 806, 808 are the access points where users of packet-based mobile devices become connected to the wireless network. In example fashion, the packet traffic originating from mobile devices is transported via an over-the-air interface to BTS 808, and from BTS 808 to BSC 802. Base station subsystems, such as BSS 800, are a part of internal frame relay network 810 that can include a service GPRS support nodes (SGSN), such as SGSN 812 or SGSN 814. Each SGSN 812, 814 is connected to an internal packet network 816 through which SGSN 812, 814 can route data packets to or from a plurality of gateway GPRS support nodes (GGSN) 818, 820, 822. As illustrated, SGSN 814 and GGSNs 818, 820, 822 are part of internal packet network 816. GGSNs 818, 820, 822 mainly provide an interface to external IP networks such as PLMN 824, corporate intranets/internets 826, or Fixed-End System (FES) or the public Internet 828. As illustrated, subscriber corporate network 826 may be connected to GGSN 820 via a firewall 830. PLMN 824 may be connected to GGSN 820 via a boarder gateway router (BGR) 832. A Remote Authentication Dial-In User Service (RADIUS) server 834 may be used for caller authentication when a user calls corporate network 826.

Generally, there may be a several cell sizes in a network, referred to as macro, micro, pico, femto or umbrella cells. The coverage area of each cell is different in different environments. Macro cells can be regarded as cells in which the base station antenna is installed in a mast or a building above average roof top level. Micro cells are cells whose antenna height is under average roof top level. Micro cells are typically used in urban areas. Pico cells are small cells having a diameter of a few dozen meters. Pico cells are used mainly indoors. Femto cells have the same size as pico cells, but a smaller transport capacity. Femto cells are used indoors, in residential or small business environments. On the other hand, umbrella cells are used to cover shadowed regions of smaller cells and fill in gaps in coverage between those cells.

Figure 9:
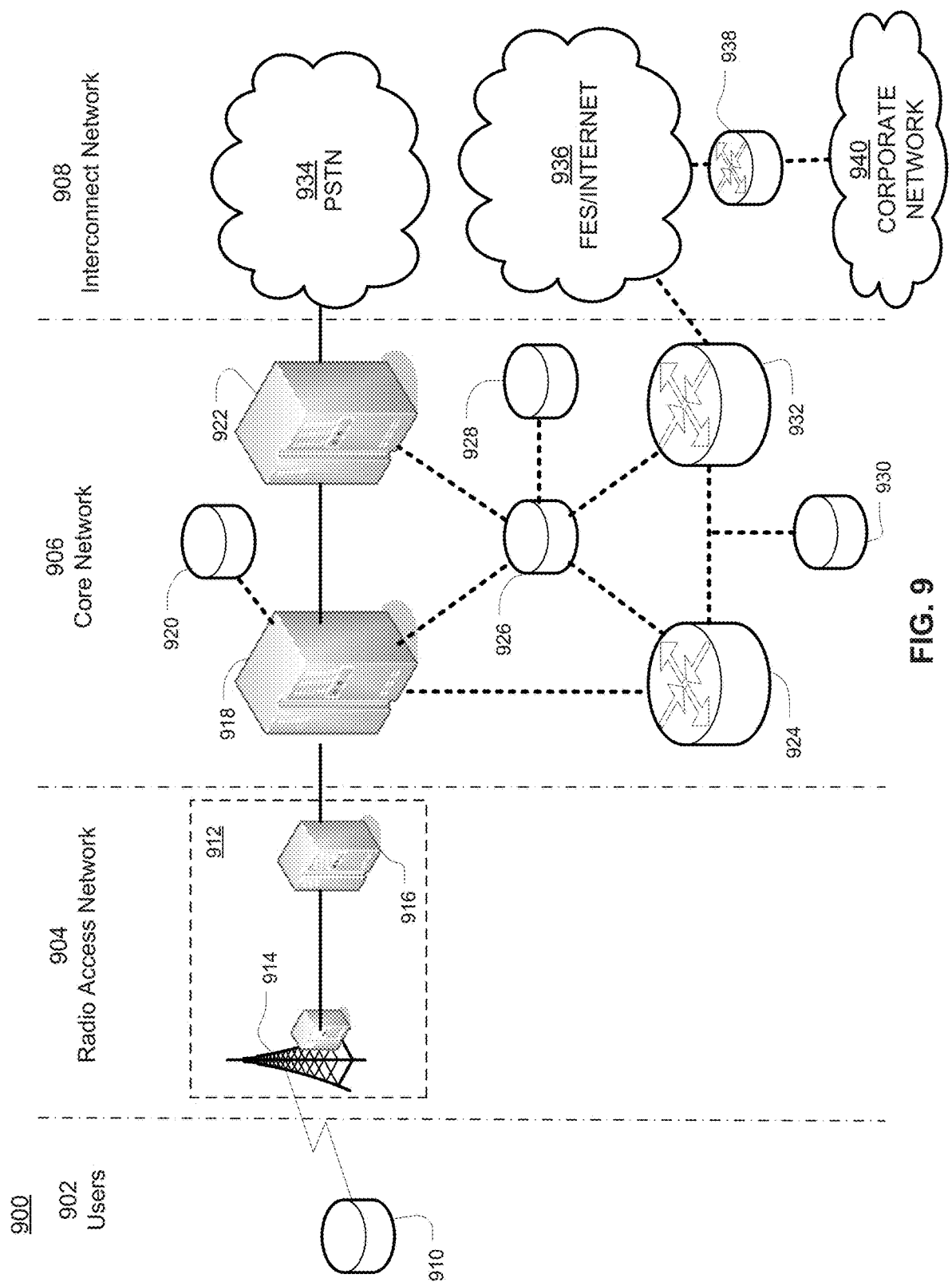
FIG. 9 illustrates an exemplary architecture of a GPRS network that may be modeled using the disclosed systems and methods for creating a graph database.

FIG. 9 illustrates an architecture of a typical GPRS network 900 as described herein. The architecture depicted in FIG. 9 may be segmented into four groups: users 902, RAN 904, core network 906, and interconnect network 908. Users 902 comprise a plurality of end users, who each may use one or more devices 910. Note that device 910 is referred to as a mobile subscriber (MS) in the description of network shown in FIG. 9. In an example, device 910 comprises a communications device (e.g., mobile device 102, mobile positioning center 116, network device 300, any of detected devices 500, second device 508, access device 604, access device 606, access device 608, access device 610 or the like, or any combination thereof). Radio access network 904 comprises a plurality of BSSs such as BSS 912, which includes a BTS 914 and a BSC 916. Core network 906 may include a host of various network elements. As illustrated in FIG. 9, core network 906 may comprise MSC 918, service control point (SCP) 920, gateway MSC (GMSC) 922, SGSN 924, home location register (HLR) 926, authentication center (AuC) 928, domain name system (DNS) server 930, and GGSN 932. Interconnect network 908 may also comprise a host of various networks or other network elements. As illustrated in FIG. 9, interconnect network 908 comprises a PSTN 934, an FES/Internet 936, a firewall 1038, or a corporate network 940.

An MSC can be connected to a large number of BSCs. At MSC 918, for instance, depending on the type of traffic, the traffic may be separated in that voice may be sent to PSTN 934 through GMSC 922, or data may be sent to SGSN 924, which then sends the data traffic to GGSN 932 for further forwarding.

When MSC 918 receives call traffic, for example, from BSC 916, it sends a query to a database hosted by SCP 920, which processes the request and issues a response to MSC 918 so that it may continue call processing as appropriate.

HLR 926 is a centralized database for users to register to the GPRS network. HLR 926 stores static information about the subscribers such as the International Mobile Subscriber Identity (IMSI), subscribed services, or a key for authenticating the subscriber. HLR 926 also stores dynamic subscriber information such as the current location of the MS. Associated with HLR 926 is AuC 928, which is a database that contains the algorithms for authenticating subscribers and includes the associated keys for encryption to safeguard the user input for authentication.

In the following, depending on context, "mobile subscriber" or "MS" sometimes refers to the end user and sometimes to the actual portable device, such as a mobile device, used by an end user of the mobile cellular service. When a mobile subscriber turns on his or her mobile device, the mobile device goes through an attach process by which the mobile device attaches to an SGSN of the GPRS network. In FIG. 9, when MS 910 initiates the attach process by turning on the network capabilities of the mobile device, an attach request is sent by MS 910 to SGSN 924. The SGSN 924 queries another SGSN, to which MS 910 was attached before, for the identity of MS 910. Upon receiving the identity of MS 910 from the other SGSN, SGSN 924 requests more information from MS 910. This information is used to authenticate MS 910 together with the information provided by HLR 926. Once verified, SGSN 924 sends a location update to HLR 926 indicating the change of location to a new SGSN, in this case SGSN 924. HLR 926 notifies the old SGSN, to which MS 910 was attached before, to cancel the location process for MS 910. HLR 926 then notifies SGSN 924 that the location update has been performed. At this time, SGSN 924 sends an Attach Accept message to MS 910, which in turn sends an Attach Complete message to SGSN 924.

Next, MS 910 establishes a user session with the destination network, corporate network 940, by going through a Packet Data Protocol (PDP) activation process. Briefly, in the process, MS 910 requests access to the Access Point Name (APN), for example, UPS.com, and SGSN 924 receives the activation request from MS 910. SGSN 924 then initiates a DNS query to learn which GGSN 932 has access to the UPS.com APN. The DNS query is sent to a DNS server within core network 906, such as DNS server 930, which is provisioned to map to one or more GGSNs in core network 906. Based on the APN, the mapped GGSN 932 can access requested corporate network 940. SGSN 924 then sends to GGSN 932 a Create PDP Context Request message that contains necessary information. GGSN 932 sends a Create PDP Context Response message to SGSN 924, which then sends an Activate PDP Context Accept message to MS 910.

Once activated, data packets of the call made by MS 910 can then go through RAN 904, core network 906, and interconnect network 908, in a particular FES/Internet 936 and firewall 1038, to reach corporate network 940.

Figure 10:
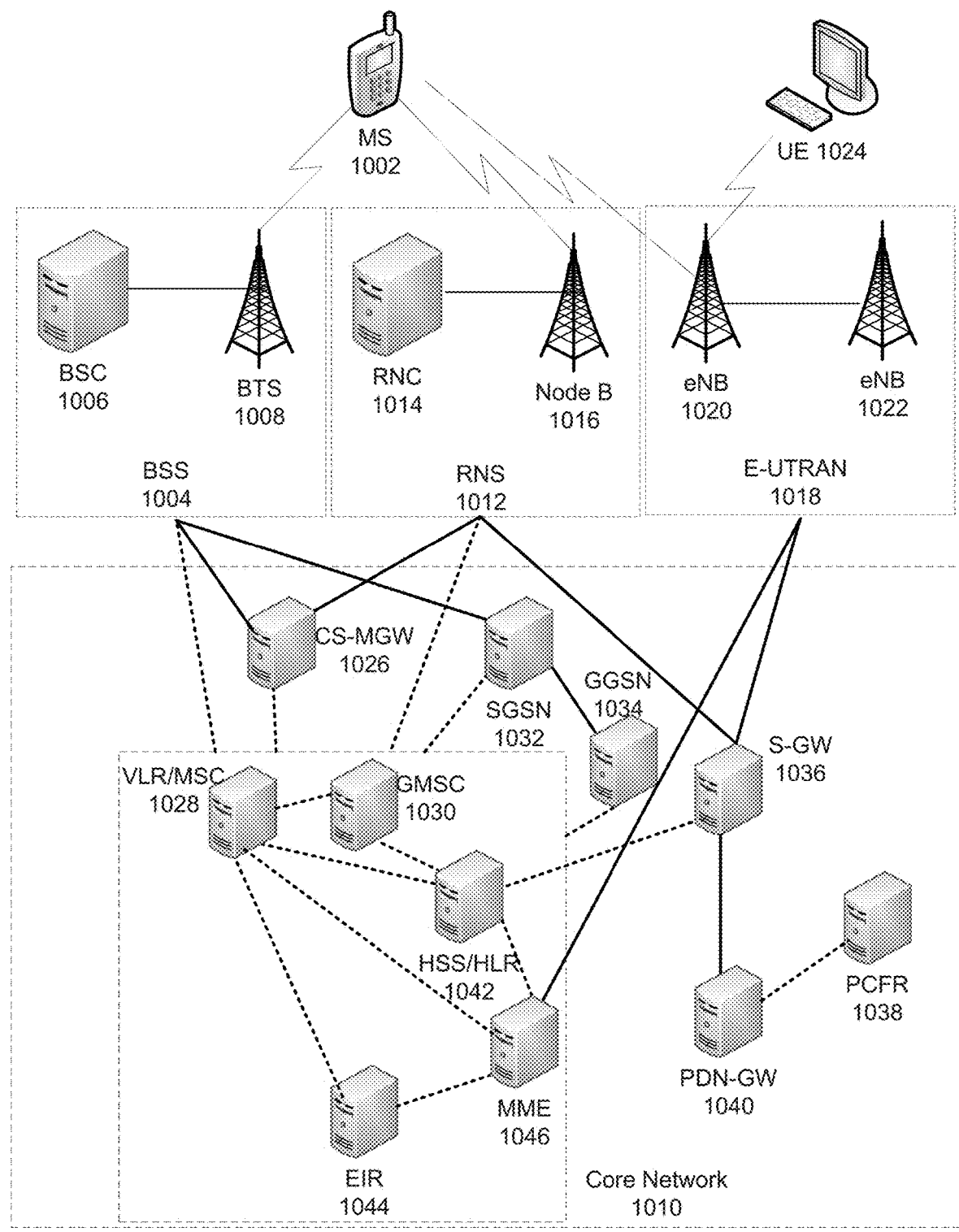
FIG. 10 is a block diagram of an exemplary public land mobile network (PLMN) that may be modeled using the disclosed systems and methods for creating a graph database.

FIG. 10 illustrates a PLMN block diagram view of an example architecture that may be replaced by a telecommunications system. In FIG. 10, solid lines may represent user traffic signals, and dashed lines may represent support signaling. MS 1002 is the physical equipment used by the PLMN subscriber. For example, drone 102, network device 300, the like, or any combination thereof may serve as MS 1002. MS 1002 may be one of, but not limited to, a cellular telephone, a cellular telephone in combination with another electronic device or any other wireless mobile communication device.

MS 1002 may communicate wirelessly with BSS 1004. BSS 1004 contains BSC 1006 and a BTS 1008. BSS 1004 may include a single BSC 1006/BTS 1008 pair (base station) or a system of BSC/BTS pairs that are part of a larger network. BSS 1004 is responsible for communicating with MS 1002 and may support one or more cells. BSS 1004 is responsible for handling cellular traffic and signaling between MS 1002 and a core network 1010. Typically, BSS 1004 performs functions that include, but are not limited to, digital conversion of speech channels, allocation of channels to mobile devices, paging, or transmission/reception of cellular signals.

Additionally, MS 1002 may communicate wirelessly with RNS 1012. RNS 1012 contains a Radio Network Controller (RNC) 1014 and one or more Nodes B 1016. RNS 1012 may support one or more cells. RNS 1012 may also include one or more RNC 1014/Node B 1016 pairs or alternatively a single RNC 1014 may manage multiple Nodes B 1016. RNS 1012 is responsible for communicating with MS 1002 in its geographically defined area. RNC 1014 is responsible for controlling Nodes B 1016 that are connected to it and is a control element in a UMTS radio access network. RNC 1014 performs functions such as, but not limited to, load control, packet scheduling, handover control, security functions, or controlling MS 1002 access to core network 1010.

An E-UTRA Network (E-UTRAN) 1018 is a RAN that provides wireless data communications for MS 1002 and UE 1024. E-UTRAN 1018 provides higher data rates than traditional UMTS. It is part of the LTE upgrade for mobile networks, and later releases meet the requirements of the International Mobile Telecommunications (IMT) Advanced and are commonly known as a 4G networks. E-UTRAN 1018 may include of series of logical network components such as E-UTRAN Node B (eNB) 1020 and E-UTRAN Node B (eNB) 1022. E-UTRAN 1018 may contain one or more eNBs. User equipment (UE) 1024 may be any mobile device capable of connecting to E-UTRAN 1018 including, but not limited to, a personal computer, laptop, mobile device, wireless router, or other device capable of wireless connectivity to E-UTRAN 1018. The improved performance of the E-UTRAN 1018 relative to a typical UMTS network allows for increased bandwidth, spectral efficiency, and functionality including, but not limited to, voice, high-speed applications, large data transfer or IPTV, while still allowing for full mobility.

Typically MS 1002 may communicate with any or all of BSS 1004, RNS 1012, or E-UTRAN 1018. In an illustrative system, each of BSS 1004, RNS 1012, and E-UTRAN 1018 may provide MS 1002 with access to core network 1010. Core network 1010 may include of a series of devices that route data and communications between end users. Core network 1010 may provide network service functions to users in the circuit switched (CS) domain or the packet switched (PS) domain. The CS domain refers to connections in which dedicated network resources are allocated at the time of connection establishment and then released when the connection is terminated. The PS domain refers to communications and data transfers that make use of autonomous groupings of bits called packets. Each packet may be routed, manipulated, processed or handled independently of all other packets in the PS domain and does not require dedicated network resources.

The circuit-switched MGW function (CS-MGW) 1026 is part of core network 1010, and interacts with VLR/MSC server 1028 and GMSC server 1030 in order to facilitate core network 1010 resource control in the CS domain. Functions of CS-MGW 1026 include, but are not limited to, media conversion, bearer control, payload processing or other mobile network processing such as handover or anchoring. CS-MGW 1026 may receive connections to MS 1002 through BSS 1004 or RNS 1012.

SGSN 1032 stores subscriber data regarding MS 1002 in order to facilitate network functionality. SGSN 1032 may store subscription information such as, but not limited to, the IMSI, temporary identities, or PDP addresses. SGSN 1032 may also store location information such as, but not limited to, GGSN address for each GGSN 1034 where an active PDP exists. GGSN 1034 may implement a location register function to store subscriber data it receives from SGSN 1032 such as subscription or location information.

Serving gateway (S-GW) 1036 is an interface which provides connectivity between E-UTRAN 1018 and core network 1010. Functions of S-GW 1036 include, but are not limited to, packet routing, packet forwarding, transport level packet processing, or user plane mobility anchoring for inter-network mobility. PCRF 1038 uses information gathered from P-GW 1036, as well as other sources, to make applicable policy and charging decisions related to data flows, network resources or other network administration functions. PDN gateway (PDN-GW) 1040 may provide user-to-services connectivity functionality including, but not limited to, GPRS/EPC network anchoring, bearer session anchoring and control, or IP address allocation for PS domain connections.

HSS 1042 is a database for user information and stores subscription data regarding MS 1002 or UE 1024 for handling calls or data sessions. Networks may contain one HSS 1042 or more if additional resources are required. Example data stored by HSS 1042 include, but is not limited to, user identification, numbering or addressing information, security information, or location information. HSS 1042 may also provide call or session establishment procedures in both the PS and CS domains.

VLR/MSC Server 1028 provides user location functionality. When MS 1002 enters a new network location, it begins a registration procedure. A MSC server for that location transfers the location information to the VLR for the area. A VLR and MSC server may be located in the same computing environment, as is shown by VLR/MSC server 1028, or alternatively may be located in separate computing environments. A VLR may contain, but is not limited to, user information such as the IMSI, the Temporary Mobile Station Identity (TMSI), the Local Mobile Station Identity (LMSI), the last known location of the mobile station, or the SGSN where the mobile station was previously registered. The MSC server may contain information such as, but not limited to, procedures for MS 1002 registration or procedures for handover of MS 1002 to a different section of core network 1010. GMSC server 1030 may serve as a connection to alternate GMSC servers for other MSs in larger networks.

EIR 1044 is a logical element which may store the IMEI for MS 1002. User equipment may be classified as either "white listed" or "black listed" depending on its status in the network. If MS 1002 is stolen and put to use by an unauthorized user, it may be registered as "black listed" in EIR 1044, preventing its use on the network. A MME 1046 is a control node which may track MS 1002 or UE 1024 if the devices are idle. Additional functionality may include the ability of MME 1046 to contact idle MS 1002 or UE 1024 if retransmission of a previous session is required.

As described herein, a telecommunications system wherein management and control utilizing a software defined network (SDN) and a simple IP are based, at least in part, on user equipment, may provide a wireless management and control framework that enables common wireless management and control, such as mobility management, radio resource management, QoS, load balancing, etc., across many wireless technologies, e.g. LTE, Wi-Fi, and future 5G access technologies; decoupling the mobility control from data planes to let them evolve and scale independently; reducing network state maintained in the network based on user equipment types to reduce network cost and allow massive scale; shortening cycle time and improving network upgradability; flexibility in creating end-to-end services based on types of user equipment and applications, thus improve customer experience; or improving user equipment power efficiency and battery life— especially for simple M2M devices—through enhanced wireless management.

While examples of a telecommunications system in which emergency alerts can be processed and managed have been described in connection with various computing devices/processors, the underlying concepts may be applied to any computing device, processor, or system capable of facilitating a telecommunications system. The various techniques described herein may be implemented in connection with hardware or software or, where appropriate, with a combination of both. Thus, the methods and devices may take the form of program code (i.e., instructions) embodied in concrete, tangible, storage media having a concrete, tangible, physical structure. Examples of tangible storage media include floppy diskettes, CD-ROMs, DVDs, hard drives, or any other tangible machine-readable storage medium (computer-readable storage medium). Thus, a computer-readable storage medium is not a signal. A computer-readable storage medium is not a transient signal. Further, a computer-readable storage medium is not a propagating signal. A computer-readable storage medium as described herein is an article of manufacture. When the program code is loaded into and executed by a machine, such as a computer, the machine becomes an device for telecommunications. In the case of program code execution on programmable computers, the computing device will generally include a processor, a storage medium readable by the processor (including volatile or nonvolatile memory or storage elements), at least one input device, and at least one output device. The program(s) can be implemented in assembly or machine language, if desired. The language can be a compiled or interpreted language, and may be combined with hardware implementations.

The methods and devices associated with a telecommunications system as described herein also may be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an device for implementing telecommunications as described herein. When implemented on a general-purpose processor, the program code combines with the processor to provide a unique device that operates to invoke the functionality of a telecommunications system.

While a telecommunications system has been described in connection with the various examples of the various figures, it is to be understood that other similar implementations may be used or modifications and additions may be made to the described examples of a telecommunications system without deviating therefrom. For example, one skilled in the art will recognize that a telecommunications system as described in the instant application may apply to any environment, whether wired or wireless, and may be applied to any number of such devices connected via a communications network and interacting across the network. Therefore, a telecommunications system as described herein should not be limited to any single example, but rather should be construed in breadth and scope in accordance with the appended claims.

The invention claimed is:

1. A system comprising:
 a processor; and
 memory comprising a graph and executable instructions, wherein the executable instructions cause the processor to effectuate operations, the operations comprising:
   receiving a query comprising pathway variables and a class generalization, wherein the class generalization comprises at least one of a component, a class field, or metadata;
   identifying a query class based on at least the class generalization;

determining an anchor set of nodes that are instantiations of a node class based on at least one of the pathway variables;
translating the pathway variables into a pathway algebraic expression based on the anchor set of nodes and the query class; and
executing the pathway algebraic expression on the graph to return a pathway set, the pathway set including:
a first node having a first type corresponding to one of: a virtual network function, a virtual network function component, a virtual machine, or physical hardware; and
a second node having a second type corresponding to one of: the virtual network function, the virtual network function component, the virtual machine, or the physical hardware,
wherein the second type is different from the first type.

2. The system of claim 1, wherein the query further identifies a parent class, wherein the query class is a subclass of the parent class and the query class comprises the class generalization, and wherein the pathway set comprises an instance of the query class.

3. The system of claim 1, wherein the graph complies with a schema, the schema comprising a plurality of classes complying with a class hierarchy and a plurality of components.

4. The system of claim 3, the operations further comprising:
identifying a common ancestor class of a subset of the plurality of classes, the common ancestor class comprising class fields;
identifying a plurality of subset components based on the subset;
defining a concept based on the class fields and the plurality of subset components; and
determining that the class generalization comprises the class fields and the plurality of subset components.

5. The system of claim 4, wherein identifying the query class comprises identifying the query class as the subset of the plurality of classes based on the class generalization satisfying the concept.

6. A method comprising:
receiving, at a processor, a query comprising a class generalization and pathway variables;
identifying, by the processor, a plurality of query classes based on the class generalization;
translating pathway variables into a pathway algebraic expression based on the plurality of query classes; and
executing the pathway algebraic expression on a graph to return a pathway set, wherein the class generalization comprises at least one of a component, a class field, or metadata, and wherein the pathway set includes:
a first node having a first type corresponding to one of: a virtual network function, a virtual network function component, a virtual machine, or physical hardware; and
a second node having a second type corresponding to one of: the virtual network function, the virtual network function component, the virtual machine, or the physical hardware,
wherein the second type is different from the first type.

7. The method of claim 6, wherein the query further identifies a parent class, wherein at least one of the query classes is a subclass of the parent class and wherein each of the plurality of query classes comprises the class generalization.

8. The method of claim 6, wherein the query comprises a second class generalization, the method further comprising:
identifying a second plurality of query classes based on the second class generalization,
wherein translating pathway variables into the pathway algebraic expression is further based on the second plurality of query classes.

9. The method of claim 6, wherein the class generalization is associated with a second plurality of classes that are different than the plurality of query classes and wherein the query comprises a second class generalization and the second plurality of classes do not satisfy the second class generalization.

10. The method of claim 6, wherein the query comprises a strongly typed concept, and wherein the strongly type concept is based on at least the class generalization.

11. The method of claim 10, wherein the graph complies with a schema, the schema comprising a plurality of classes complying with a class hierarchy and a plurality of components, the method further comprising:
identifying a common ancestor class of a subset of the plurality of classes, the common ancestor class comprising class fields;
identifying a plurality of components based on the subset; and
defining the strongly typed concept based on the class fields and the plurality of components.

12. A non-transitory computer-readable storage medium storing instructions that cause a processor executing the instructions to effectuate operations, the operations comprising:
receiving a query comprising a class generalization and pathway variables;
identifying a plurality of query classes based on the class generalization;
translating the pathway variables into a pathway algebraic expression based on the plurality of query classes; and
executing the pathway algebraic expression on a graph to return a pathway set, the pathway set including:
a first node having a first type corresponding to one of: a virtual network function, a virtual network function component, a virtual machine, or physical hardware; and
a second node having a second type corresponding to one of: the virtual network function, the virtual network function component, the virtual machine, or the physical hardware,
wherein the second type is different from the first type.

13. The non-transitory computer-readable storage medium of claim 12, wherein the query comprises a second class generalization and the operations further comprise:
identifying a second plurality of query classes based on the second class generalization,
wherein translating the pathway variables into the pathway algebraic expression is further based on the second plurality of query classes.

14. The non-transitory computer-readable storage medium of claim 12, wherein the class generalization comprises at least one of a component, a class field, or metadata.

15. The non-transitory computer-readable storage medium of claim 12, wherein the graph complies with a schema, the schema comprising a plurality of classes complying with a class hierarchy and a plurality of components.

16. The non-transitory computer-readable storage medium of claim 15, wherein the operations further comprise:
   identifying a common ancestor class of a subset of the plurality of classes, the common ancestor class comprising class fields;
   identifying a plurality of components based on the subset;
   defining a first concept based on the class fields and the plurality of components,
   determining that the class generalization comprises the class fields and the plurality of components; and
   identifying a first query class of the plurality of query classes as comprising the subset based on the class generalization satisfying a strongly typed concept,
   wherein the query further identifies a parent class, wherein at least one of the query classes is a subclass of the parent class and wherein each of the plurality of query classes comprises the class generalization.

17. The non-transitory computer-readable storage medium of claim 12, wherein the pathway set complies with a pathway expression, and wherein the pathway expression includes a node pattern.

18. The non-transitory computer-readable storage medium of claim 17, wherein the node pattern comprises first constraints on first attributes, and wherein nodes of the graph that satisfy the first constraints are included in the pathway set.

19. The non-transitory computer-readable storage medium of claim 18, wherein the pathway expression further includes an edge pattern, wherein the edge pattern comprises second constraints on second attributes, and wherein edges of the graph that satisfy the second constraints are included in the pathway set.

20. The non-transitory computer-readable storage medium of claim 12, wherein the graph comprises a layered graph that includes a first layer and a second layer, wherein the pathway set includes a pathway that corresponds to an instance of an induction pattern, wherein the instance of the induction pattern includes a vertical traversal from the first layer of the layered graph to the second layer of the layered graph, and wherein the instance of the induction pattern includes a horizontal traversal in the second layer.

* * * * *